United States Patent
Li et al.

(10) Patent No.: US 11,105,915 B2
(45) Date of Patent: Aug. 31, 2021

(54) APPARATUS, SYSTEM AND METHOD OF RANGING MEASUREMENT

(71) Applicant: INTEL CORPORATION, Santa Clara, CA (US)

(72) Inventors: Qinghua Li, San Ramon, CA (US); Feng Jiang, Santa Clara, CA (US); Xintian Lin, Palo Alto, CA (US); Ofer Bar-Shalom, Kiryat Ono (IL); Leor Banin, Petach Tikva (IL); Jonathan Segev, Tel Mond (IL); Assaf Gurevitz, Ramat Hasharon (IL); Yuval Amizur, Kfar Saba (IL); Robert Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 261 days.

(21) Appl. No.: 16/438,828

(22) Filed: Jun. 12, 2019

(65) Prior Publication Data
US 2019/0293780 A1  Sep. 26, 2019

Related U.S. Application Data

(60) Provisional application No. 62/684,347, filed on Jun. 13, 2018.

(51) Int. Cl.
*G01S 13/76* (2006.01)
*H04B 17/309* (2015.01)

(52) U.S. Cl.
CPC .......... *G01S 13/765* (2013.01); *H04B 17/309* (2015.01)

(58) Field of Classification Search
CPC ... G01S 13/765; H04B 17/309; H04L 1/0026; H04L 25/0212; H04L 25/0232; H04L 25/0224; H04L 5/0051; H04W 84/12; H04W 64/00
See application file for complete search history.

(56) References Cited

U.S. PATENT DOCUMENTS

2014/0327579 A1* 11/2014 Hart .................... H04W 64/006
                                                              342/374
2017/0171766 A1*  6/2017 Amizur ................. H04W 24/08

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

Primary Examiner — Kabir A Timory
(74) Attorney, Agent, or Firm — Shichrur & Co.

(57) ABSTRACT

Some demonstrative embodiments include apparatuses systems and/or methods of ranging measurement. For example, an apparatus may include circuitry and logic configured to cause a first wireless communication station (STA) to receive from a second STA a sounding transmission for a range measurement of a range between the first STA and the second STA; to determine a channel response estimation based on the sounding transmission from the second STA; to determine a timing value based on the channel response estimation; and to transmit a feedback message to the second STA, the feedback message including the timing value.

25 Claims, 14 Drawing Sheets

APPARATUS, SYSTEM AND METHOD OF RANGING MEASUREMENT

CROSS REFERENCE

This application claims the benefit of and priority from U.S. Provisional Patent Application No. 62/684,347 entitled "COMPRESSED CHANNEL STATE INFORMATION FEEDBACK", filed Jun. 13, 2018, the entire disclosure of which is incorporated herein by reference.

TECHNICAL FIELD

Embodiments described herein generally relate to ranging measurement.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
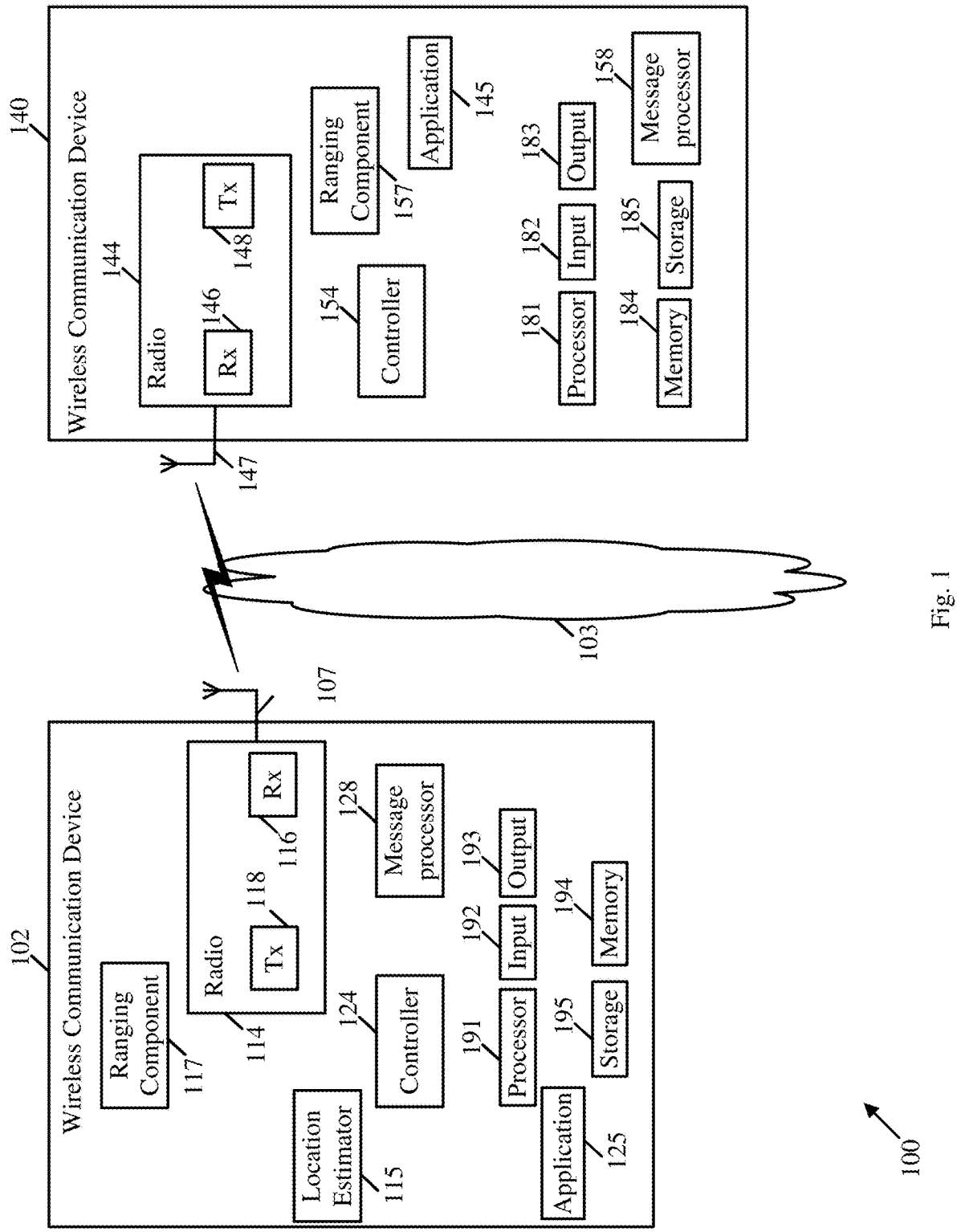
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2016* (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016); and/or IEEE 802.11az (*P802.11az™/D1.0 Draft Standard for Information technology—Telecommunications and information exchange between systems Local and metropolitan area networks—Specific requirements; Part 11: Wireless LAN Medium Access Control 10 (MAC) and Physical Layer (PHY) Specifications; Amendment 3: Enhancements for positioning, February* 2019)) and/or future versions and/or derivatives thereof, devices and/or networks operating in accordance with existing WiFi Alliance (WFA) Specifications (including *Wi-Fi Neighbor Awareness Networking (NAN) Technical Specification, Version* 1.0, *May* 1, 2015) and/or future versions and/or derivatives thereof, devices and/or networks operating in accordance with existing WFA Peer-to-Peer (P2P) specifications (including *WiFi P2P technical specification, version* 1.5, *Aug.* 4, 2014) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, devices 102 and/or 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more Neighbor Awareness Networking (NAN) STAs.

In some demonstrative embodiments, one or more of devices 102 and/or 140 may include, operate as, and/or perform the functionality of an AP STA, and/or one or more of wireless devices 102 and/or 140 may include, operate as, and/or perform the functionality of a non-AP STA. In other embodiments, devices 102 and/or 140 may operate as and/or perform the functionality of any other STA.

For example, the AP may include a router, a PC, a server, a Hot Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102 and/or 140, and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a SIG band, and/or any other band.

In some demonstrative embodiments, radios 114 and/or 144 may include, or may be associated with, one or more antennas 107 and/or 147, respectively.

In one example, device 102 may include a single antenna 107. In another example, device may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102 and 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102 and 140, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may include, operate as, perform the role of, and/or perform one or more functionalities of, one or more STAs. For example, device 102 may include at least one STA, and/or device 140 may include at least one STA.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, devices 102 and/or 140 may be configured to perform a positioning and/or ranging measurement, e.g., as described below.

In some demonstrative embodiments, devices 102 and/or 140 may include one or more applications configured to provide and/or to use one or more location based services, e.g., a social application, a navigation application, a location based advertising application, and/or the like. For example, device 102 may include an application 125 to be executed by device 102, and/or device 140 may include an application 145 to be executed by device 140.

In some demonstrative embodiments, application 125 may use range information, for example, to determine an estimated location of device 102, e.g., with respect to a coordinate system, e.g., a World Geodetic System 1984 (WGS84), and/or a local coordinate system.

In some demonstrative embodiments, application 145 may use range information, for example, to determine an estimated location of device 140, e.g., with respect to the coordinate system, and/or the local coordinate system.

In one example, device 102 may include a Smartphone, which is located in a shop, e.g., in a shopping mall. According to this example, application 125 may use the range information to determine a relative location of device 102, for example, to receive sale offers from the shop.

In another example, device 102 may include a mobile device, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to perform one or more positioning measurements to be used to estimate a location of device 102, e.g., as described below.

In some demonstrative embodiments, location estimator 115 may be configured to determine a location of device 102, for example, using a plurality of ranges from a plurality of other STAs, e.g., by performing trilateration.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate a location, for example, based on time based range measurements, for example, with one or more other devices.

In some demonstrative embodiments, location estimator 115 may be configured to estimate the location of device 102, for example, based on time based range measurements, for example, with one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a Round Trip Time (RTT) measurement (also referred to as "Time of Flight (ToF) procedure").

In some demonstrative embodiments, an RTT value may be defined as the overall time a signal propagates from a first station, e.g., device 140, to a second station, e.g., device 102, and back to the first station.

In some demonstrative embodiments, a distance between the first and second stations may be determined based on the RTT value, for example, by dividing the RTT value by two and multiplying the result by the speed of light.

In some demonstrative embodiments, a ToF value may be defined as the overall time a signal propagates from a first station, e.g., device 102, to a second station, e.g., device 140.

In some demonstrative embodiments, the distance between the first and second stations may be determined based on the ToF value, for example, by multiplying the ToF value by the speed of light.

In some demonstrative embodiments, the ToF measurement procedure may include a Fine Timing Measurement (FTM) procedure.

In some demonstrative embodiments, the ToF measurement procedure may include a Very High Throughput (VHT) ranging measurement procedure.

In some demonstrative embodiments, the ToF measurement procedure may include a High Efficiency (HE) ranging measurement procedure.

In some demonstrative embodiments, the ToF measurement procedure may include one or more operations, communications, and/or measurements according to any other additional or alternative positioning measurement.

In some demonstrative embodiments, devices 102 and/or 140 may be configured to perform one or more operations of range measurements, location measurements, and/or positioning measurements, e.g., as described below.

In some demonstrative embodiments, devices 102 and/or 140 may be configured to perform one or more positioning measurements, for example, which may be implemented, for example, in accordance with a Next-Generation Positioning (NGS) Task Group (TG), e.g., in accordance with an IEEE 802.11az Specification, for example, to provide a technical advantage of improved scalability.

In some demonstrative embodiments, devices 102 and/or 140 may be configured to perform one or more ranging measurements, ToF measurements, HE ranging measurements, VHT measurements, FTM measurements, positioning measurements and/or communications, ranging measurements and/or communications, proximity measurements and/or communications, location estimation measurements and/or communications.

In some demonstrative embodiments, devices 102 and/or 140 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

In some demonstrative embodiments, devices 102 and/or 140 may be configured to perform one or more HE ranging measurements, for example, using WLAN communications, e.g., WiFi. For example, using WiFi to perform time based range measurements, e.g., ranging measurements, may enable, for example, increasing an indoor location accuracy of the mobile devices, e.g., in an indoor environment.

Some demonstrative embodiments are described below with respect to ranging measurements according to a HE ranging procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102 and/or 140 may be configured to perform one or more positioning measurements and/or communications, for example, according to a ranging mechanism, for example, using WLAN communications, e.g., WiFi. For example, using WiFi to perform time based range measurements, may enable, for example, increasing an indoor location accuracy of the mobile devices, e.g., in an indoor environment.

In some demonstrative embodiments, device 102 may include a ranging component 117, and/or device 140 may include a ranging component 157, which may be configured to perform one or more ranging measurements, operations and/or communications, e.g., as described below.

In some demonstrative embodiments, ranging components 117 and/or 157 may be configured to perform one or more operations and/or communications of a HE ranging protocol. In other embodiments, ranging components 117 and/or 157 may be configured to perform one or more operations and/or communications of any other positioning measurement.

In some demonstrative embodiments, ranging components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of ranging components 117 and/or 157. Additionally or alternatively, one or more functionalities of ranging components 117 and/or 157 may be implemented by logic, which may be executed by a machine and/or one or more processors, e.g., as described below.

In some demonstrative embodiments, ranging component 117 may be configured to perform one or more operations of, and/or at least part of the functionality of, message processor 128 and/or controller 124, for example, to trigger communication of one or more ranging messages and/or positioning packets, for example, sounding signals and/or Null Data Packets (NDPs), e.g., as described below.

In some demonstrative embodiments, ranging component 157 may be configured to perform one or more operations of, and/or at least part of the functionality of, message processor 158 and/or controller 154, for example, to trigger communication of one or more ranging messages and/or positioning packets, for example, sounding signals and/or NDPs, e.g., as described below.

In some demonstrative embodiments, ranging components 117 and/or 157 may be configured to trigger ranging transmissions and/or measurements, for example, periodically and/or upon a request from an application executed by a device, for example, to determine an accurate location of the device.

In some demonstrative embodiments, ranging components 117 and/or 157 may be configured to perform one or more measurements according to a ranging protocol, e.g., as described below.

In some demonstrative embodiments, ranging components 117 and/or 157 may be configured to perform one or more proximity, ranging, and/or location estimation measurements, e.g., in an indoor location, based on the ranging protocol. For example, the ranging mechanism may provide a relatively accurate estimation of location, range and/or proximity, e.g., in an indoor location.

Some demonstrative embodiments are described herein with respect to a positioning component, e.g., ranging components 117 and/or 157, configured to perform measurements according to the HE ranging protocol and/or procedure. However, in other embodiments, the positioning component may be configured to perform any other additional or alternative type of Time of Flight (ToF) measurements, VHT ranging measurements, ranging measurements, positioning measurements, proximity measurements, and/or location estimation measurements, e.g., according to any additional or alternative protocol and/or procedure.

In some demonstrative embodiments, devices 102 and/or 140 may be configured to perform one or more positioning measurements, for example, according to the HE ranging protocol, e.g., as described below.

In some demonstrative embodiments, devices 102 and/or 140 may be configured to perform a ranging measurement, for example, an RTT measurement, e.g., as described below.

Figure 2:
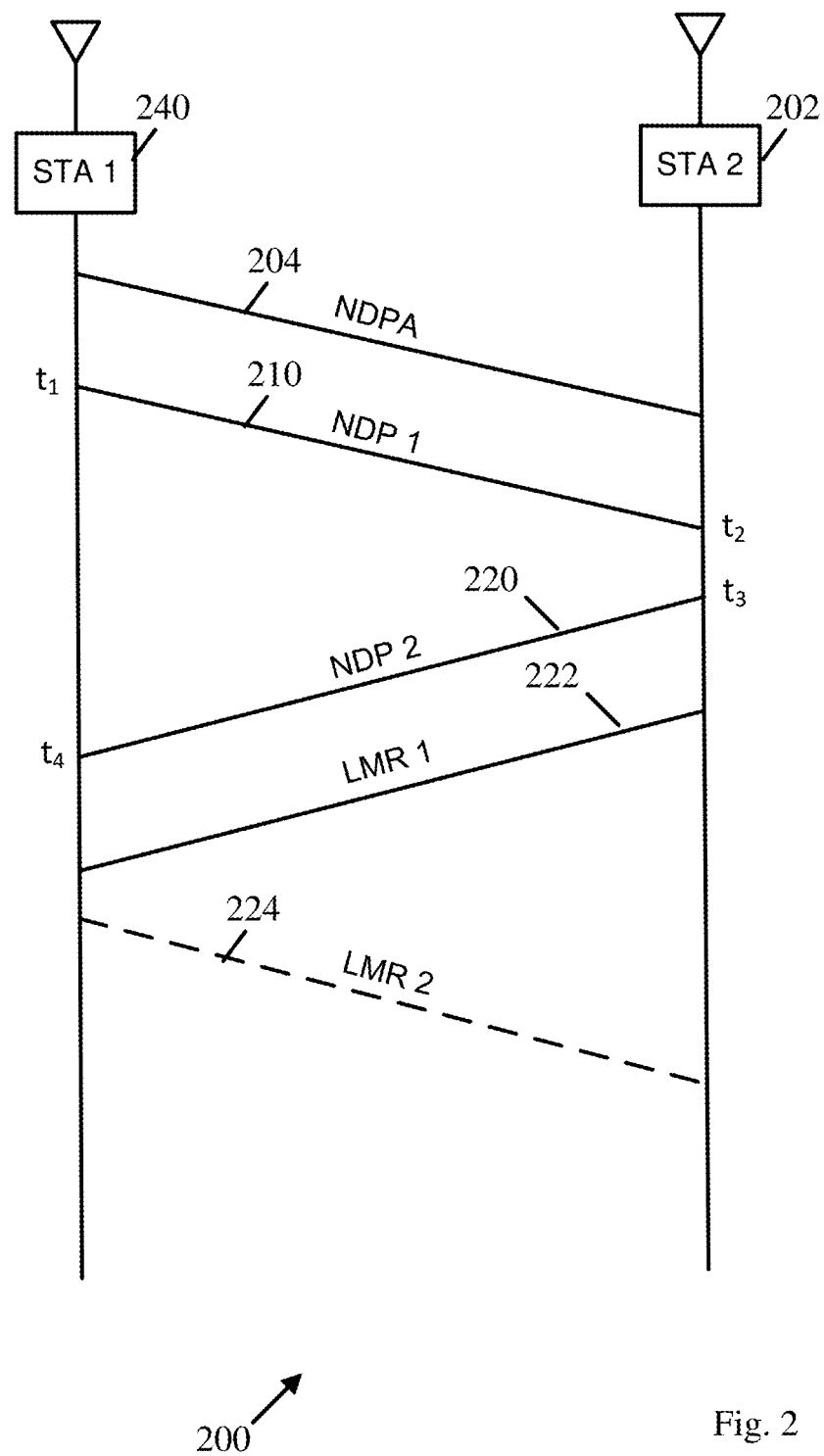
FIG. 2 is a schematic illustration of messages of a ranging measurement, in accordance with some demonstrative embodiments.

Reference is made to FIG. 2, which schematically illustrates messages of a ranging measurement 200, in accordance with some demonstrative embodiments.

In one example, ranging measurement 200 may include a single user (SU) ranging measurement, for example, in accordance with an IEEE802.11az Specification.

In one example, ranging measurement 200 may be used to determine a range between a first STA 240 and a second STA 202.

In some demonstrative embodiments, device 102 (FIG. 1) may be configured to perform a role of, one or more functionalities of, and/or one or more operations of STA 202; and/or device 140 (FIG. 1) may be configured to perform a role of, one or more functionalities of, and/or one or more operations of, STA 240.

As shown in FIG. 2, ranging measurement 200 may include exchanging one or more messages between STA 240 and STA 202.

As shown in FIG. 2, ranging measurement 200 may include exchanging of one or more sounding transmissions, e.g., sounding Null Data Packets (NDPs).

As shown in FIG. 2, STA 240 may transmit to STA 202 an announcement message 204, e.g., an NDP Announcement (NDPA), for example, to announce the ranging measurement 200 between STAs 202 and 240.

As shown in FIG. 200, the ranging measurement 200 may include transmission of a first sounding transmission 210 (NDP1), e.g., from STA 240 to STA 202.

As shown in FIG. 2, the ranging measurement 200 may include transmission of a second sounding transmission 220 (NDP2), e.g., from STA 202 to STA 240.

As shown in FIG. 2, the ranging measurement 200 may include transmission of a first feedback message, e.g., a first Location Measurement Report (LMR1) 222 including first measurement results, e.g., from STA 202 to STA 240.

For example, the first measurement results may include timing information, for example, information of a Time of Departure (ToD) of sounding transmission 220.

As shown in FIG. 2, the ranging measurement 200 may optionally include transmission of a second feedback message 224, e.g., LMR2, including second measurement results, e.g., from STA 240 to STA 202.

For example, the second measurement results may include timing information, for example, information of a ToD of sounding transmission 210.

In some demonstrative embodiments, one or more timing values (also referred to as "time stamps") may be defined for ranging measurement 200, e.g., as described below.

In some demonstrative embodiments, a time stamp $t_1$ may be defined as a Time of Departure (ToD) of sounding signal 210 (NDP1), for example, as measured according to a clock of STA 240.

In some demonstrative embodiments, a time stamp $t_2$ may be defined as a Time of Arrival (ToA) of sounding signal 210 (NDP1), for example, as measured according to a clock of STA 202.

In some demonstrative embodiments, a time stamp $t_3$ may be defined as a Time of Departure (ToD) of sounding signal 220 (NDP2), for example, as measured according to the clock of STA 202.

In some demonstrative embodiments, a time stamp $t_4$ may be defined as a Time of Arrival (ToA) of sounding signal 220 (NDP2), for example, as measured according to the clock of STA 240.

Figure 3:
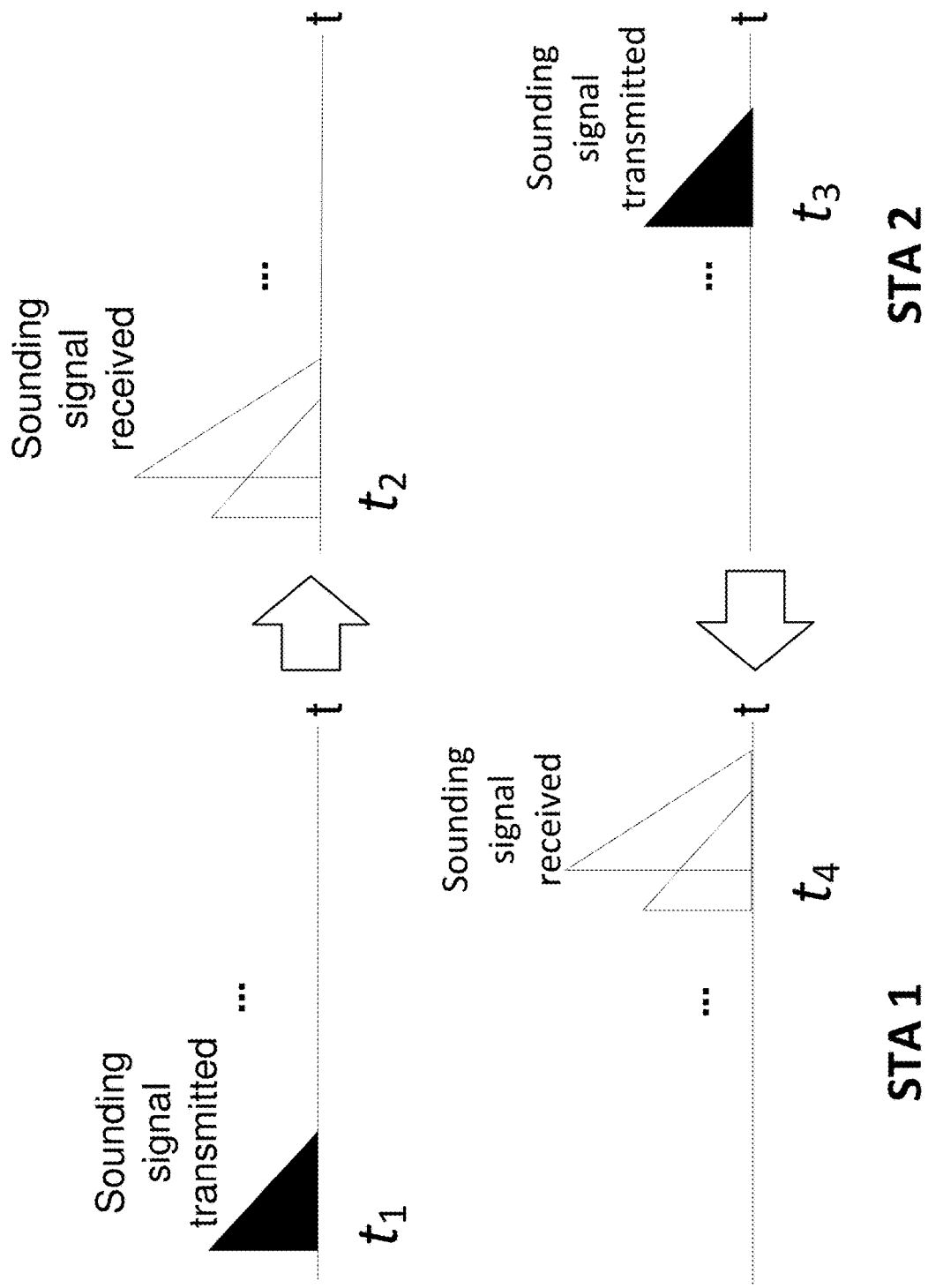
FIG. 3 is a schematic illustration of time stamps of a ranging measurement, in accordance with some demonstrative embodiments.

Reference is also made to FIG. 3, which schematically illustrates time stamps of a ranging measurement, e.g., in accordance with some demonstrative embodiments, For example, the time stamps of FIG. 3 may include the time stamps $t_1$, $t_2$, $t_3$, and/or $t_4$ of ranging measurement 200 (FIG. 2).

In some demonstrative embodiments, there may be an offset between two clocks of two respective different devices performing a ranging measurement, e.g., the clocks of STAs 202 and 240, for example, when the two clocks are not synchronized to a same reference clock, e.g., a GPS clock.

In some demonstrative embodiments, for example, in some use cases, implementations and/or scenarios, estimating a time of arrival (ToA) by a ranging device, e.g., estimating the time stamp $t_2$ by STA 202 and/or estimating the time stamp $t_4$ by STA 240, may not be suitable for some devices, for example, low cost devices, e.g., tag devices or any other devices. For example, estimation of the ToA may require high complexities, e.g., for achieving high accuracies, and some devices, e.g., low cost devices may not support or afford these high complexities.

Referring back to FIG. 1, in some demonstrative embodiments, a first device, e.g., device 102, may include, for example, a low cost device, a tag device, or any other device, which may be configured, for example, to estimate, a timing value of a received sounding transmission, for example, instead of the ToA of the sounding transmission from a second device, e.g., device 140, as described below.

In some demonstrative embodiments, the first device may be configured to estimate the timing value based on a channel response estimation, e.g., a Channel State Information (CSI) estimation, as described below.

In some demonstrative embodiments, the first device, which may receive the sounding transmission from a second device, may include a channel response estimation, e.g., a CSI estimation, and may feedback the compressed CSI to the second device. For example, the compressed CSI feedback may be implemented instead of an estimation of the ToA of the sounding transmission, e.g., as described below.

In some demonstrative embodiments, the second device may receive the feedback, may estimate one or more values for the first device, e.g., based on the feedback from the first device, e.g., the distance, an RTT, a ToA and/or any other value. In one example, the second device may optionally send the estimated value, e.g., the distance, RTT and/or ToA, to the first device.

In some demonstrative embodiments, for example, in opposed to compressions of CSI, which may be used for beamforming and may be used to send more than a hundred numbers, a compressed feedback for a ranging measurement, e.g., as described below, may include a reduced amount of timing information, e.g., even only one number, which may be suitable to convey timing information, for example, to support compensating of the clock offset in the range estimation, e.g., as described below.

In some demonstrative embodiments, the compressed CSI for the ranging measurement, e.g., as described below, may include timing information in the form of one or more timing values (time stamps).

In some demonstrative embodiments, a content in feedback messages, e.g., LMR1 222 and/or LMR2 224 (FIG. 2), may be configured, for example, to support overhead reduction and/or low complexity for ranging measurement, e.g., as described below.

In some demonstrative embodiments, LMR1 222 (FIG. 2) may be configured to include timing information of a compressed CSI, e.g., a timing value based on the channel estimation of NDP1 210 (FIG. 2); and/or LMR2 224 (FIG. 2) may include a distance estimate, for example, based on the timing information in LMR1 222 (FIG. 2), e.g., as described below.

Figure 4:
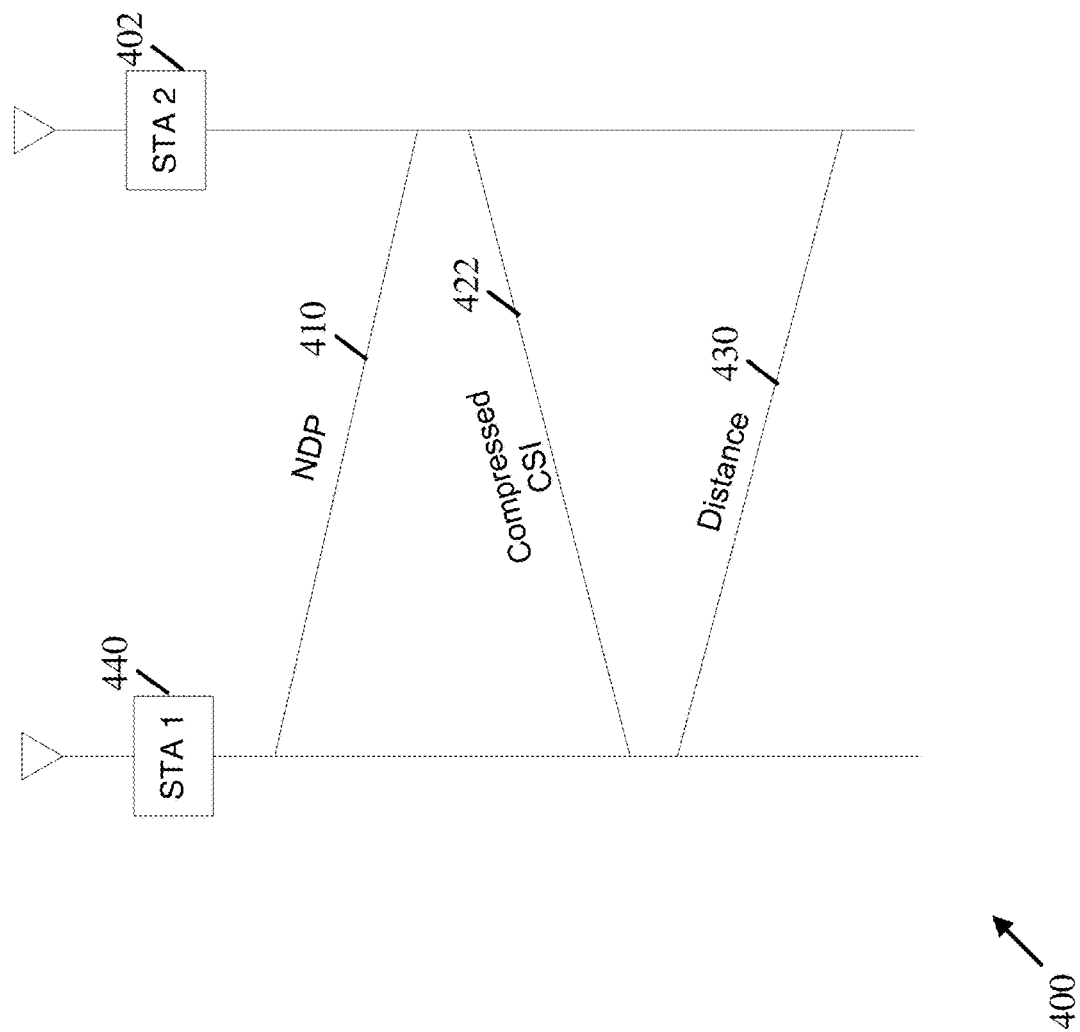
FIG. 4 is a schematic illustration of messages of a ranging measurement, in accordance with some demonstrative embodiments.

Reference is made to FIG. 4, which schematically illustrates messages of a ranging measurement 400, in accordance with some demonstrative embodiments In one example, ranging measurement 400 may be implemented by a first STA 440 and a second STA 402, e.g., to determine a range between the STA 402 and the STA 440.

In some demonstrative embodiments, device 102 (FIG. 1) may be configured to perform a role of, one or more functionalities of, and/or one or more operations of STA 402; and/or device 140 (FIG. 1) may be configured to perform a role of, one or more functionalities of, and/or one or more operations of, STA 440.

In some demonstrative embodiments, as shown in FIG. 4, STA 402 may receive a sounding transmission 410 (NDP) from STA 440, STA 402 may determine a timing value, e.g., in the form of a compressed CSI, and may send a feedback message 422 including the timing value, e.g., the compressed CSI, to STA 440. For example, the compressed CSI may be utilized instead of an estimation and feedback of the ToA of the sounding transmission 410, e.g., as described below.

In some demonstrative embodiments, as shown in FIG. 4, STA 440 may receive the feedback message 422 including the compressed CSI, may estimate a distance between STA 440 and 402, and may optionally send a report 430 including the estimated distance to the STA 402.

In some demonstrative embodiments, the compressed CIS feedback may be utilized to provide a technical advantage of allowing a low complexity implementation of a device for a ranging measurement, e.g., as described below.

In some demonstrative embodiments, a STA participating in a range measurement with a second STA, for example, a low cost device, a tag device, or any other device, may be allowed to send the CSI feedback to the second STA, for example, in a way which may allow the first STA to avoid processing the CSI with high complexities.

In some demonstrative embodiments, channel reciprocity may be exploited to provide an overhead reduction for the ranging measurement, e.g., as described below.

In some demonstrative embodiments, it may be assumed that a bi-directional channel is almost the same in both directions, e.g., up to a complex scalar. According to this assumption, there may be no need for the first STA to feedback a detailed description about the channel response to the second STA, for example, if the first STA sounds the channel for the second STA. For example, for ranging or positioning it may be enough to consider the timing values (time stamps), e.g., arrival times and departure times, while a detailed channel response may not be needed.

In some demonstrative embodiments, estimation of a ToA, e.g., the time stamps $t_2$ and/or $t_4$, may require high implementation and/or computational complexities, e.g., for achieving high accuracies.

In some demonstrative embodiments, in some use cases, scenarios, and/or implementations, a STA participating in a range measurement with a second STA, e.g., a low cost tag, cannot afford the high complexities for estimating the ToA of a sounding transmission from the second STA, and/or only the second STA may need distance information corresponding to the range between the first and second STAs. In such cases, the first STA may feed the compressed CSI back to the second STA, e.g., instead of the ToA, for example, to let the second STA to estimate the distance.

In some demonstrative embodiments, it may not be efficient to utilize for the range measurement procedure a conventional CSI feedback, in which the channel response estimated by the first STA is quantized and sent back to the second STA. For example, such CSI feedback may incur large overhead, which may waste a bandwidth and/or a transmission power, e.g., which may reduce a battery lifetime.

In some demonstrative embodiments, it may be assumed that channel responses estimated by the first and second STAs participating in the range measurement may be the same, e.g., except for a time shift and/or a complex scalar, for example, assuming that the channel is reciprocal within a channel coherence time, e.g., 10 milliseconds (ms).

In some demonstrative embodiments, implementing bidirectional sounding, e.g., using NDP1 and NDP2 (FIG. 2), may allow both the first and second STAs to estimate the channel response. Therefore, there may be no need for the first STA to feed a full channel response, e.g., a full CSI, back to the second STA. Instead, the first STA may send time information, which may support the second STA in estimating an RTT and the distance, for example, based on the RTT, e.g., as described below.

In some demonstrative embodiments, a first device, e.g., device 102, may be configured to receive a sounding transmission from a second device, e.g., device 140, to estimate a timing value, e.g., instead of estimating the ToA of the sounding transmission, and to transmit to the second device a feedback message including the timing value, e.g., as described below.

In some demonstrative embodiments, the second device, e.g., device 140, may be configured to receive the feedback message including the timing value, e.g., from device 140, and to determine the RTT from the first device, e.g., device 102, for example, based on the timing value in the feedback message, e.g., as described below.

In some demonstrative embodiments, ranging component 117 may be configured to control, cause and/or trigger device 102 to receive from device 140 a sounding transmission for a range measurement of a range between device 102 and device 140, e.g., as described below.

In some demonstrative embodiments, the sounding transmission may include a Null Data Packet (NDP), for example, e.g., NDP1 210 (FIG. 2) or NDP 410 (FIG. 4), e.g., as described below.

In some demonstrative embodiments, ranging component 117 may be configured to control, cause and/or trigger device 102 to determine a channel response estimation based on the sounding transmission from device 140, e.g., as described below.

In some demonstrative embodiments, ranging component 117 may be configured to control, cause and/or trigger device 102 to determine a timing value based on the channel response estimation, e.g., as described below.

In some demonstrative embodiments, ranging component 117 may be configured to control, cause and/or trigger device 102 to transmit to device 140 a feedback message, e.g., LMR1 222 (FIG. 2) or feedback message 422 (FIG. 4), including the timing value, e.g., as described below.

In some demonstrative embodiments, the feedback message may include a Location Measurement Report (LMR), e.g., as described below. In other embodiments, the feedback message may include any other type of message.

In some demonstrative embodiments, the timing value may be shifted from a Time of Arrival (ToA) of the sounding transmission, e.g., as described below.

In some demonstrative embodiments, the timing value may be different from the ToA of the sounding transmission, e.g., as described below.

In some demonstrative embodiments, the timing value may be after the ToA of the sounding transmission, e.g., as described below.

In other embodiments, the timing value may include any other value, which is not the ToA of the sounding transmission, and may support estimation of the RTT between devices 102 and 140.

In some demonstrative embodiments, device 140 may transmit the sounding transmission to device 102, e.g., as described below.

In some demonstrative embodiments, ranging component 157 may be configured to control, cause and/or trigger device 140 to transmit to device 102 the sounding transmission for the range measurement of the range between device 140 and device 102, e.g., as described below.

In some demonstrative embodiments, ranging component 157 may be configured to control, cause and/or trigger device 140 to process the feedback message from device 102 including the timing value for the range measurement, e.g., as described below.

In some demonstrative embodiments, the feedback message may include the timing value for the range measurement, the timing value may be based on the channel response estimation, which may be based on reception of the sounding transmission at device 102, e.g., as described below.

In some demonstrative embodiments, ranging component 157 may be configured to control, cause and/or trigger device 140 to determine the RTT based on the timing value, e.g., as described below.

In some demonstrative embodiments, ranging component 157 may be configured to control, cause and/or trigger device 140 to determine an estimated range between devices 102 and 140, for example, based on the RTT, e.g., as described below.

In some demonstrative embodiments, ranging component 157 may be configured to control, cause and/or trigger device 140 to transmit a report message, e.g., LMR2 224 (FIG. 2) or report message 430 (FIG. 4), to device 102, e.g., as described below.

In some demonstrative embodiments, the report message may include range measurement information based on the RTT, e.g., as described below.

In some demonstrative embodiments, the report message may include the estimated range between devices 102 and 140, e.g., as described below.

In some demonstrative embodiments, device 102 may be configured to receive and/or process the report message from device 140, e.g., as described below.

In some demonstrative embodiments, ranging component 117 may be configured to control, cause and/or trigger device 102 to process the report message from device 140 including the RTT, which is based, for example, on the timing value from device 102, e.g., as described below.

In some demonstrative embodiments, ranging component 117 may be configured to control, cause and/or trigger device 102 to process the report message from device 140 including the estimated range between devices 102 and 140, which is based, for example, on the timing value from device 102, e.g., as described below.

In some demonstrative embodiments, the ranging measurement between devices 102 and 140 may include an exchange of two sounding transmissions, e.g., one sounding transmission from device 140 to device 102, and another sounding transmission from device 102 to device 140, e.g., as described below.

In some demonstrative embodiments, ranging component 117 may be configured to control, cause and/or trigger device 102 to determine a channel response estimation based on a first sounding transmission from device 140, e.g., NDP1 210 (FIG. 2), and to transmit a second sounding transmission, e.g., NDP2 220 (FIG. 2), to device 140, e.g., as described below.

In some demonstrative embodiments, ranging component 157 may be configured to control, cause and/or trigger device 140 to transmit the first sounding transmission to device 102; to process the feedback message including a first timing value, which may be based on a first channel response estimation of the first sounding transmission; to determine a second channel response estimation based on the second sounding transmission from device 102; to determine a second timing value based on the second channel response estimation; and to determine the RTT between devices 102 and 140 based on the first and second timing values, e.g., as described below.

In some demonstrative embodiments, the first sounding transmission and/or the second sounding transmission may include an NDP, e.g., as described below.

In some demonstrative embodiments, the second timing value may be shifted from a ToA of the second sounding transmission, e.g., as described below.

In some demonstrative embodiments, the second timing value may be different from the ToA of the second sounding transmission, e.g., as described below.

In some demonstrative embodiments, the second timing value may be after the ToA of the second sounding transmission, e.g., as described below.

In other embodiments, the second timing value may include any other value, which is not the ToA of the sounding transmission, and may support estimation of the RTT at the device 102.

In some demonstrative embodiments, the feedback message, e.g., from device 102, may include a Time of Departure (ToD) value corresponding to a ToD of the second sounding transmission.

In some demonstrative embodiments, device 140 may be configured to estimate a ToA of the second sounding transmission, for example, in addition to the estimation of the second timing value of the second sounding transmission, e.g., as described below.

In some demonstrative embodiments, ranging component 157 may be configured to control, cause and/or trigger device 140 to determine a ToA of the second sounding transmission.

In some demonstrative embodiments, ranging component 157 may be configured to control, cause and/or trigger device 140 to determine the RTT, for example, based on a ToD of the first sounding transmission, the ToA of the second sounding transmission, the first and second timing values, and the ToD value in the feedback message corresponding to the ToD of the second sounding transmission, e.g., as described below.

In some demonstrative embodiments, device 102 may be configured to estimate a ToA of the first sounding transmission, for example, in addition to the estimation of the first timing value.

In some demonstrative embodiments, device 102 may be configured to include the ToA of the first sounding transmission in the feedback message, e.g., in addition to the first timing value corresponding to the first sounding transmission.

In some demonstrative embodiments, for example, device 140 may be configured to receive from device 102 the feedback message including both the first timing value corresponding to the first sounding transmission as well as the ToA of the first sounding transmission.

In some demonstrative embodiments, for example, device 140 may be configured to determine the RTT between devices 102 and 140, for example, based on the first timing value corresponding to the first sounding transmission and the ToA of the first sounding transmission, for example, even without estimating the ToA of the second sounding transmission.

For example, the inclusion of both the both the first timing value corresponding to the first sounding transmission as well as the ToA of the first sounding transmission in the feedback message may be useful, for example, in use cases, implementations and/or scenarios, where the device 140 may be allowed to determine a range estimate with low complexity, for example, such that device 140 may calculate the low-complexity timing value, e.g., the second timing value based on the second sounding transmission from device 102, while not being required to determine a high complexity ToA, e.g., the ToA of the second sounding transmission.

Figure 5:
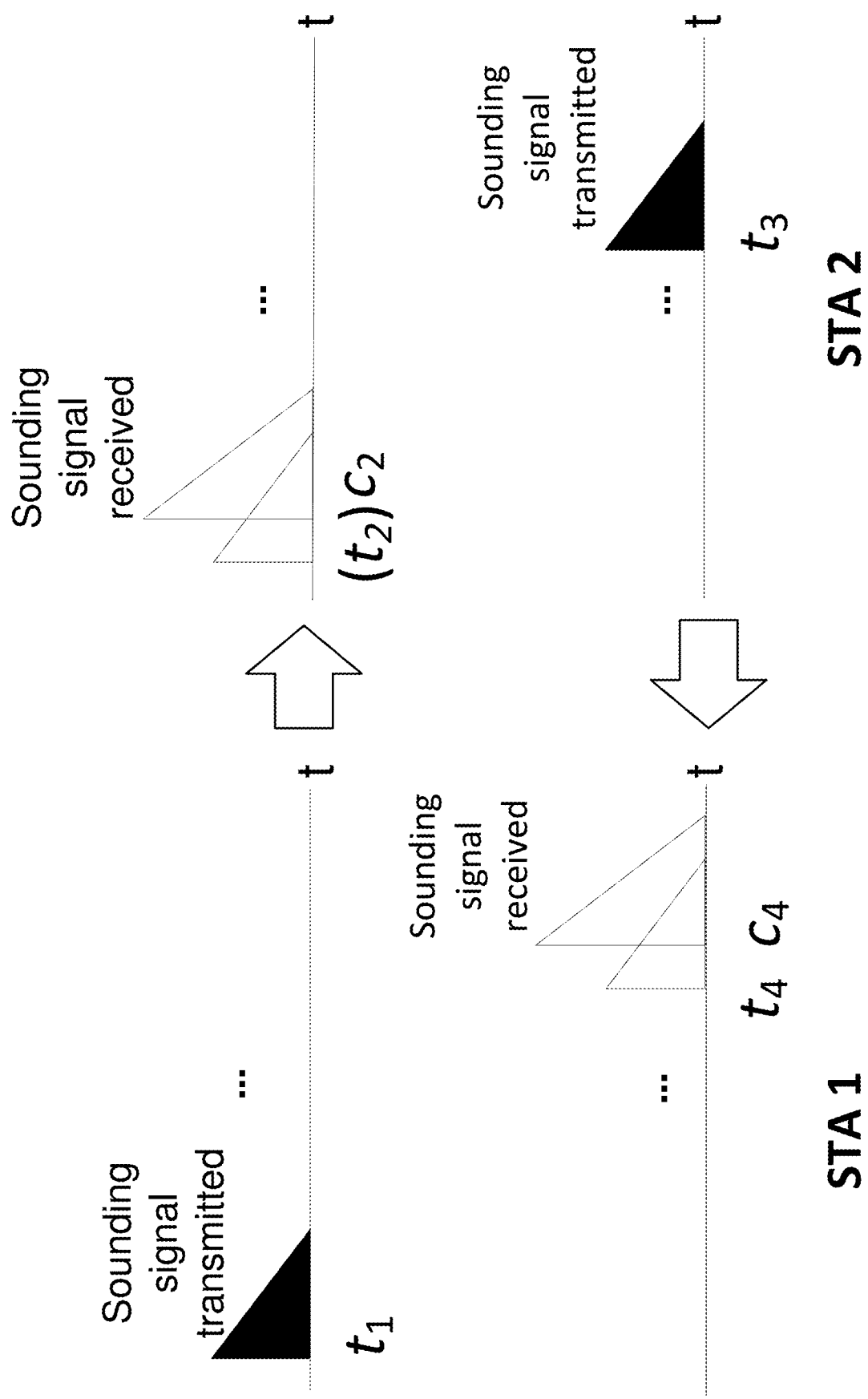
FIG. 5 is a schematic illustration of timing values of a ranging measurement, in accordance with some demonstrative embodiments.

Reference is made to FIG. 5, which schematically illustrates time stamps of a ranging measurement, in accordance with some demonstrative embodiments.

In some demonstrative embodiments, the ranging measurement of FIG. 5 may be implemented by a first STA, e.g., device 102 (FIG. 1), and a second STA, e.g., device 140 (FIG. 1). For example, as shown in FIG. 5, the first STA may transmit a first sounding signal at a time stamp $t_1$, which may be received at the second STA at a time stamp $t_2$; and the second STA may transmit a second sounding signal at a time stamp $t_3$, which may be received at the first STA at a time stamp $t_4$. In one example, the time stamps $t_1$, $t_2$, $t_3$, and/or $t_4$ may correspond to the time stamps of the ranging measurement 200 (FIG. 2).

In some demonstrative embodiments, as shown in FIG. 5, the first STA, e.g., device 102 (FIG. 1), may be configured to estimate a first timing value, denoted $c_2$, for example, instead of the time stamp $t_2$.

In some demonstrative embodiments, the first STA, e.g., device 102 (FIG. 1), may be configured to feedback the first timing value to the second STA, e.g., instead of the ToA value $t_2$.

In some demonstrative embodiments, as shown in FIG. 5, the second STA, e.g., device 140 (FIG. 1), may be configured to estimate a second timing value, denoted $c_4$, for example, in addition to the time stamp $t_4$.

In some demonstrative embodiments, as shown in FIG. 5, the timing value $c_2$ may be different from, for example, may be after the ToA of the first sounding signal; and the timing value $c_4$ may be different from, for example, may be after, the ToA of the second sounding signal. For example, the timing value $c_2$ may be shifted from the ToA $t_2$, e.g., of sounding signal 210 (NDP1); and/or the timing value $c_4$ may be shifted from the ToA $t_4$, e.g., of sounding signal 220 (NDP2).

In some demonstrative embodiments, the timing value $c_2$ may be determined by the first STA, for example, by a full CSI, for example, using a low complexity method, e.g., as described below.

In some demonstrative embodiments, the first STA, e.g., device 102 (FIG. 1), may not need to implement high complexities, which may be required for estimating $t_2$. Instead, the first STA may be configured to compute the timing value $c_2$, e.g., with low complexities.

In some demonstrative embodiments, the timing value $c_2$ and/or the timing value $c_4$ may be utilized to estimate the RTT between the first and second STAs, for example, according to an RTT calculation, which may be different from an RTT based on the time stamps $t_1$, $t_2$ $t_3$, and/or $t_4$, which may be determined, e.g., as follows:

$$\text{RTT} = t_4 - t_1 - (t_3 - t_2) \tag{1}$$

In some demonstrative embodiments, the RTT may be determined based on the timing value $c_2$ and/or the timing value $c_4$, for example, instead of the value of $t_2$, e.g., as follows:

$$\text{RTT} = t_4 - t_1 - \{t_3 - [c_2 - (c_4 - t_4)]\} = 2t_4 - t_1 - t_3 + c_2 - c_4 \tag{2}$$

wherein $(c_4 - t_4)$ may represent the time duration between a first channel arrival, e.g., of NDP 220 (FIG. 2), and the timing value $c_4$.

In some demonstrative embodiments, the RTT may be determined based on the timing value $c_2$ and/or the timing value $c_4$, for example, instead of the value of $t_4$, e.g., as follows:

$$\text{RTT} = [c_4 - (c_2 - t_2)] - t_1 - (t_3 - t_2) = 2t_2 - t_3 - t_1 - c_2 + c_4 \tag{3}$$

In some demonstrative embodiments, timing values $c_2$ and $c_4$ may be computed for example, using a same calculation method, for example, to allow synchronizing two clocks in the first and second STAs, respectively, which may differ, e.g., by a clock offset, denoted d, e.g., as described below.

Figure 6:
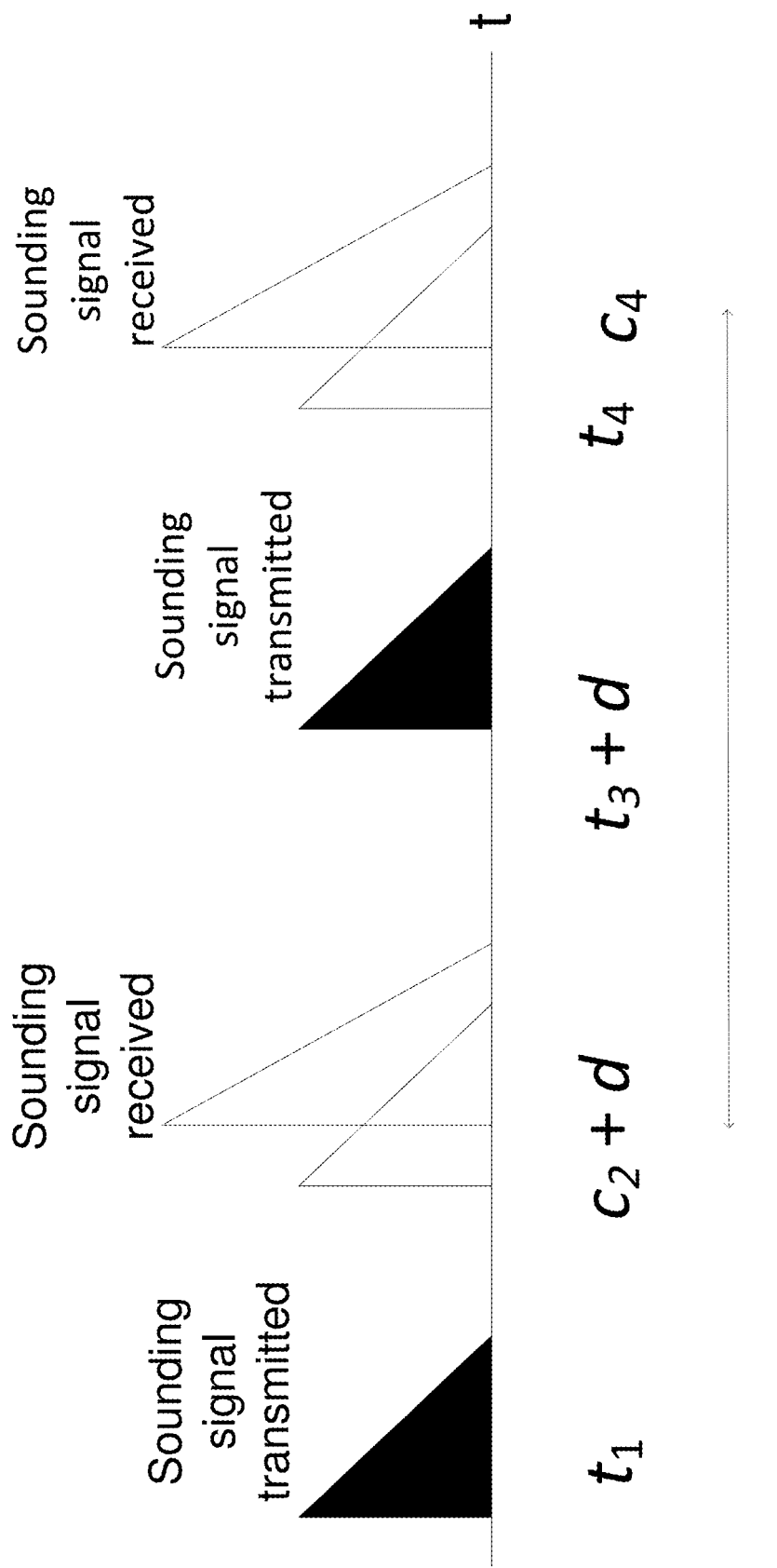
FIG. 6 is a schematic illustration of timing values of a ranging measurement, in accordance with some demonstrative embodiments.

Reference is made to FIG. 6, which schematically illustrates time stamps of a ranging measurement, e.g., in accordance with some demonstrative embodiments.

In some demonstrative embodiments, for example, the time stamps of FIG. 6 may correspond to the respective time stamps shown in FIG. 5.

In some demonstrative embodiments, as shown in FIG. 6, there may be a clock offset, denoted d, between clocks of the STA1 and STA2 participating in the range measurement.

In some demonstrative embodiments, the clock offset d may be determined, e.g., as follows:

$$t_3 + d - t_1 = c_4 - (c_2 + d) => 2d = c_4 - c_2 + t_1 - t_3 => d = (c_4 - c_2 + t_1 - t_3)/2 \tag{4}$$

In some demonstrative embodiments, a time of flight (ToF) value may be determined based on the RTT, e.g., as follows:

$$\text{ToF}=\text{RTT}/2=t_4-(t_3+d) \quad (5)$$

In some demonstrative embodiments, substituting Equation (4) into Equation (5) may result in Equation (2). For example, as a simple check, when the timing values $c_2$ and $t_2$, are equal, and the timing values $c_4$ and $t_4$ are equal, e.g., $c_2=t_2$, $c_4=t_4$, then substitution of the timing values into Equation (2) may result with Equation (1).

In some demonstrative embodiments, the timing value $c_2$ may be utilized for the ranging measurement, for example, instead of the time stamp $t_2$, which may incur high complexities. For example, the RTT may be determined based on the timing value $c_2$, e.g., according to Equation (2), which may not require the time stamp $t_2$.

In some demonstrative embodiments, the timing value $c_4$ may be utilized for the ranging measurement, for example, instead of the time stamp $t_4$, which may incur high complexities. For example, the RTT may be determined based on the timing value $c_4$, e.g., according to Equation (3), which may not require the time stamp $t_4$.

In some demonstrative embodiments, there may be several options for estimating the timing values $c_2$ and/or $c_4$ for example, with low complexity, e.g., as described below.

In some demonstrative embodiments, according to a first option, a timing value, e.g., the first or second timing value, for example, the timing values $c_2$ and/or $c_4$, may be determined, for example, based on a frequency-domain channel response estimation, e.g., as described below.

In some demonstrative embodiments, a timing value corresponding to a received sounding transmission, e.g., the timing values $c_2$ and/or the timing value $c_4$, may be determine as a phase shift of the sounding transmission, e.g., as described below.

Referring back to FIG. 1, in some demonstrative embodiments, device 102 may be configured to determine the first timing value, e.g., the timing value $c_2$, to include a phase shift of the first sounding transmission from device 140, e.g., NDP 210 (FIG. 2) or NDP 410 (FIG. 4), e.g., as described below.

In some demonstrative embodiments, device 140 may be configured to determine the second timing value, e.g., the timing value $c_4$, to include a phase shift of the second sounding transmission from device 102, e.g., NDP 220 (FIG. 2), e.g., as described below.

In one example, the timing value corresponding to the received sounding transmission may be determined in part by a phase shift in an estimated channel response, for example, based on the sounding transmission.

In some demonstrative embodiments, ranging component 117 may be configured to control, cause and/or trigger device 102 to determine the first timing value, e.g., the timing value $c_2$, based on a frequency-domain channel response estimation of the first sounding transmission from device 140, e.g., as described below.

In some demonstrative embodiments, ranging component 117 may be configured to control, cause and/or trigger device 102 to determine the first timing value based on a phase slope of the frequency-domain channel response estimation of the first sounding transmission, e.g., as described below.

In some demonstrative embodiments, ranging component 157 may be configured to control, cause and/or trigger device 140 to determine the second timing value, e.g., the timing value $c_4$, based on a frequency-domain channel response estimation of the second sounding transmission from device 102, e.g., as described below.

In some demonstrative embodiments, ranging component 157 may be configured to control, cause and/or trigger device 140 to determine the second timing value based on a phase slope of the frequency-domain channel response estimation of the second sounding transmission, e.g., as described below.

In some demonstrative embodiments, the timing value $c_2$ and/or the timing value $c_4$ may be calculated in frequency domain directly, for example, to support complexity reduction. For example, when calculating a timing value in a time-domain, an additional FFT may be required, e.g., for transforming channel estimates from the frequency-domain to the time-domain.

In some demonstrative embodiments, due to channel reciprocity, time-domain channel responses estimated by two ranging devices may be assumed to differ, e.g., substantially only by a global time shift and/or a global complex scalar, e.g., assuming no noise over the channel. For example, the global time shift may carry time information, which may be utilized, e.g., to determine the RTT.

In some demonstrative embodiments, a time-domain shift may be represented by a linear phase shift in the frequency domain, e.g., as described below.

Figure 7:
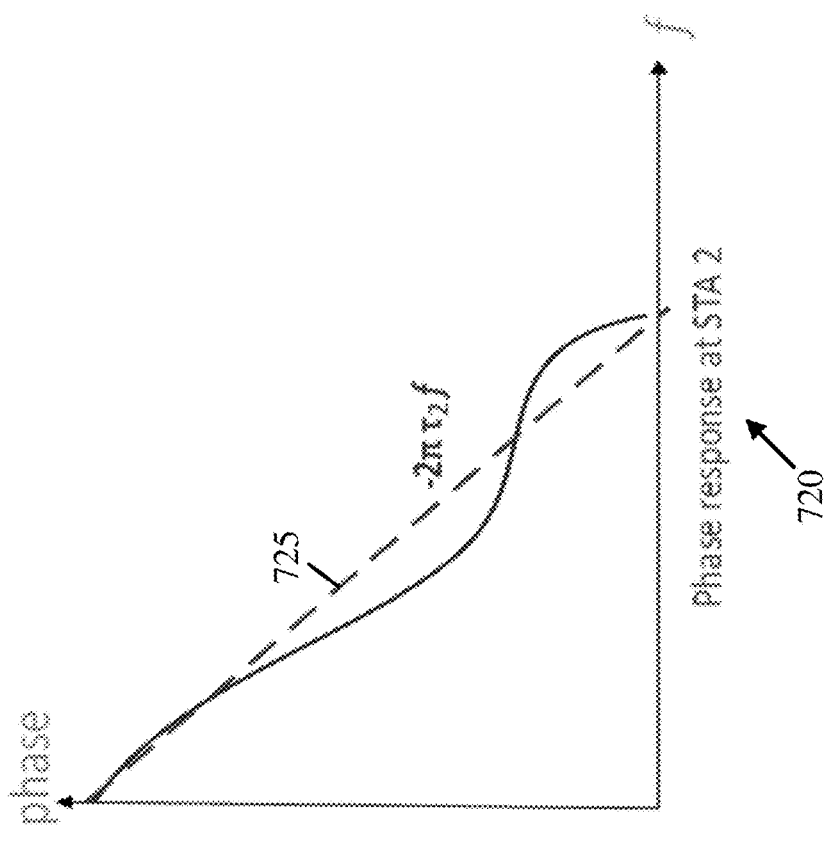
FIG. 7 is a schematic illustration of a first phase response at a first wireless communication station (STA), and a second phase response at a second STA, in accordance with some demonstrative embodiments.
Figure 7:
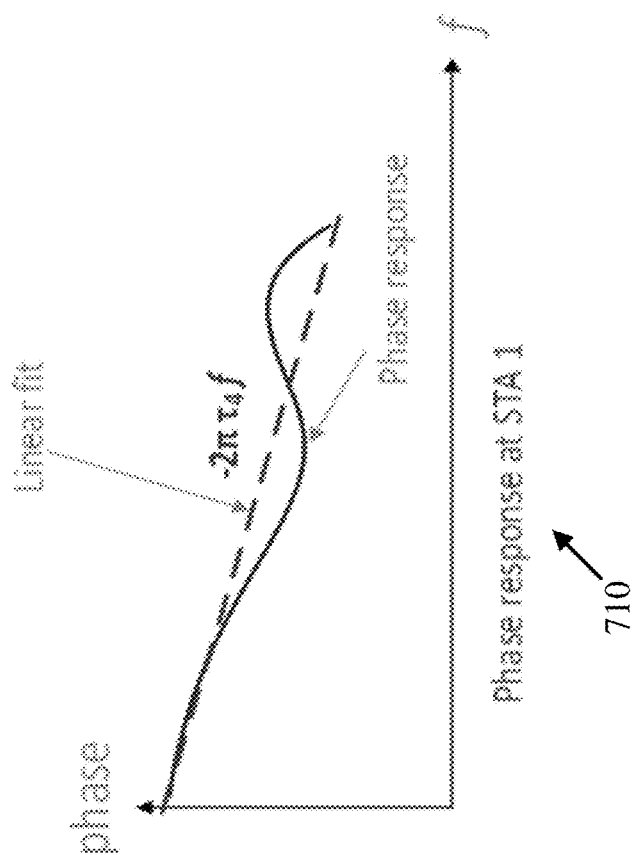

Reference is made to FIG. 7, which schematically illustrates a first phase response 710 at a first STA (STA1), and a second phase response 720 at a second STA (STA2), in accordance with some demonstrative embodiments.

In one example, phase response 710 may be estimated at device 102 (FIG. 1), for example, based on a first sounding transmission, e.g., NDP1 210 (FIG. 2); and/or phase response 720 may be estimated at device 140 (FIG. 1), for example, based on a second sounding transmission, e.g., NDP2 220 (FIG. 2).

In some demonstrative embodiments, global time shifts, denoted $\tau_4$ and $\tau_2$, may be observed at STA1 and STA2 with their clocks, respectively.

In some demonstrative embodiments, assuming no noise, two magnitude responses may be the same at the two STAs. In addition, the two phase responses 710 and 720 may differ only by a linear term, e.g., $2\pi(\tau_4-\tau_2)f$ plus a constant.

In some demonstrative embodiments, slopes of the phase responses, or even a difference between the slopes, may be estimated, for example, in order to estimate a clock offset between the two ranging (or positioning) devices STA1 and STA2. For example, STA 2 may estimate a slope 725 of the phase response 720 and may send it back to STA1, e.g., as the timing value $c_2$.

In some demonstrative embodiments, the STA2 may estimate the slope of the phase response 720 according to one or more methods, e.g., as described below.

In some demonstrative embodiments, according to one estimation method, a frequency-domain channel response may be fit to a channel response of a single tap channel with various delays.

In some demonstrative embodiments, a delay with the best fit may be used as the timing value $c_2$. The delay with the best fit may find a largest channel tap in a time-domain channel response, for example, similar to estimations in the time-domain, e.g., as described below.

In some demonstrative embodiments, estimating the delay with the best fit may provide an increased performance.

In some demonstrative embodiments, according to another estimation method, the timing value $c_2$ may be estimated, for example, with reduced complexity, e.g., as follows:

$$c_2 = \frac{1}{2\pi N \Delta f} \sum_{i=1}^{N} \Delta \theta_i \quad (6)$$

wherein $\Delta \theta_i \in (-\pi, \pi]$ denotes a phase difference of two channel responses of an i-th pair of subcarriers, which are $\Delta f$ apart, and N denotes a number of subcarrier pairs, which are available in the estimated channel response.

In some demonstrative embodiments, there may be (K−L) pairs of subcarriers for a contiguous band with a total bandwidth (K−1)b, and a subcarrier pair bandwidth (L b), where b denotes a subcarrier spacing, and $\Delta f = Lb$.

For example, $\Delta \theta_i = \theta_{i,2} - \theta_{i,1}$, where $\theta_{i,2} \theta_{i,1} \in (-\pi, \pi]$ denote phase responses of the subcarriers of the i-th pair, respectively, and $\theta_{i,1}$ and $\theta_{i,2}$ may be for the subcarriers with the higher and lower frequencies, respectively.

In some demonstrative embodiments, the subcarrier pair bandwidth $\Delta f$ may be determined to be large for channels with small frequency selectivity, for example, to increase an estimation accuracy. For example, for typical indoor channels $\Delta f$ may be about 2 Megahertz (MHz), or any other value.

In some demonstrative embodiments, since a channel response may be faded, e.g., at some subcarriers, smaller weights for those subcarriers may be used, for example, in order to enhance the estimation accuracy, e.g., as follows:

$$c_2 = \frac{\sum_{i=1}^{N} w_i \Delta \theta_i}{2\pi \Delta f \sum_{i=1}^{N} w_i} \quad (7)$$

wherein $w_i = \text{mtn}(h_{i,1}, h_{i,2})$, $w_i = \sqrt{h_{i,1} h_{i,2}}$, or $w_i = h_{i,1} h_{i,2}$, and wherein $h_{i,1}$ and $h_{i,2}$ denote channel response magnitudes of an i-th subcarrier pair, respectively.

In some demonstrative embodiments, another estimation method may be used for estimating the timing value $c_2$ in a manner similar to Equation (7), with weighting and a lower complexity, e.g., as follows:

$$c_2 = \frac{1}{2\pi \Delta f} \text{angle}(h(1:\text{end} - L) \cdot h(L+1:\text{end})') \quad (8)$$

wherein angle (•) calculates a phase of a complex number, (•)' denotes a conjugate transpose of a vector, h denotes a vector containing the frequency domain channel response, L denotes an index shift number, and the variable end denotes an index of a last entity in the vector.

It is noted that, for example, that right-hand side of Equation 8 may be mathematically equivalent to:

$$-\frac{1}{2\pi \Delta f} \text{angle}(h(1:\text{end} - L)' \cdot h(L+1:\text{end}))$$

For example, a reference time, e.g., a time zero, to be used for Equation (8) may be a start time of a window, e.g., an FFT or DFT window, which may be used for calculating the frequency domain channel response h. Other time references can be used, for example, such that $c_2$ and $t_3$ use the same time reference, e.g., a same clock, since the difference between $c_2$ and $t_3$ may matter and the time references may get subtracted out.

In some demonstrative embodiments, for example, the timing value $c_4$ may be estimated using Equation (8), e.g., in a similar manner. For example, other time references may be used for $c_4$, for example, such that $c_4$ and $t_1$ use the same time reference, e.g., the same clock. For example, different time references may simply add different constants to Equation (8), which may be subtracted out, e.g., latter in the RTT estimation.

Referring back to FIG. 1, in some demonstrative embodiments, devices 102 and/or 140 may be configured to determine a timing value of the received sounding transmission, e.g., the first timing value and/or the second timing value, for example, the timing values $c_2$ and/or $c_4$, for example, based on a time-domain channel response estimation, e.g., as described below.

In some demonstrative embodiments, ranging component 117 may be configured to control, cause and/or trigger device 102 to determine the first timing value, for example, based on a time-domain channel response estimation of the first sounding transmission, for example, NDP 210 (FIG. 2), e.g., as described below.

In some demonstrative embodiments, ranging component 157 may be configured to control, cause and/or trigger device 140 to determine the second timing value, for example, based on a time-domain channel response estimation of the second sounding transmission, for example, NDP 220 (FIG. 2), e.g., as described below.

In some demonstrative embodiments, 102 and/or 140 may be configured to determine a timing value of the received sounding transmission, e.g., the first timing value and/or the second timing value, for example, the timing values $c_2$ and/or $c_4$, for example, based on a maximal multipath arrival having a maximal magnitude in an estimated time-domain channel response, e.g., as described below.

In some demonstrative embodiments, ranging component 117 may be configured to control, cause and/or trigger device 102 to determine the first timing value, for example, based on a maximal multipath arrival having a maximal magnitude in the estimated time-domain channel response of the first sounding transmission, for example, NDP 210 (FIG. 2), e.g., as described below.

In some demonstrative embodiments, ranging component 157 may be configured to control, cause and/or trigger device 140 to determine the second timing value, for example, based on a maximal multipath arrival having a maximal magnitude in the estimated time-domain channel response of the second sounding transmission, for example, NDP 220 (FIG. 2), e.g., as described below.

Figure 8:
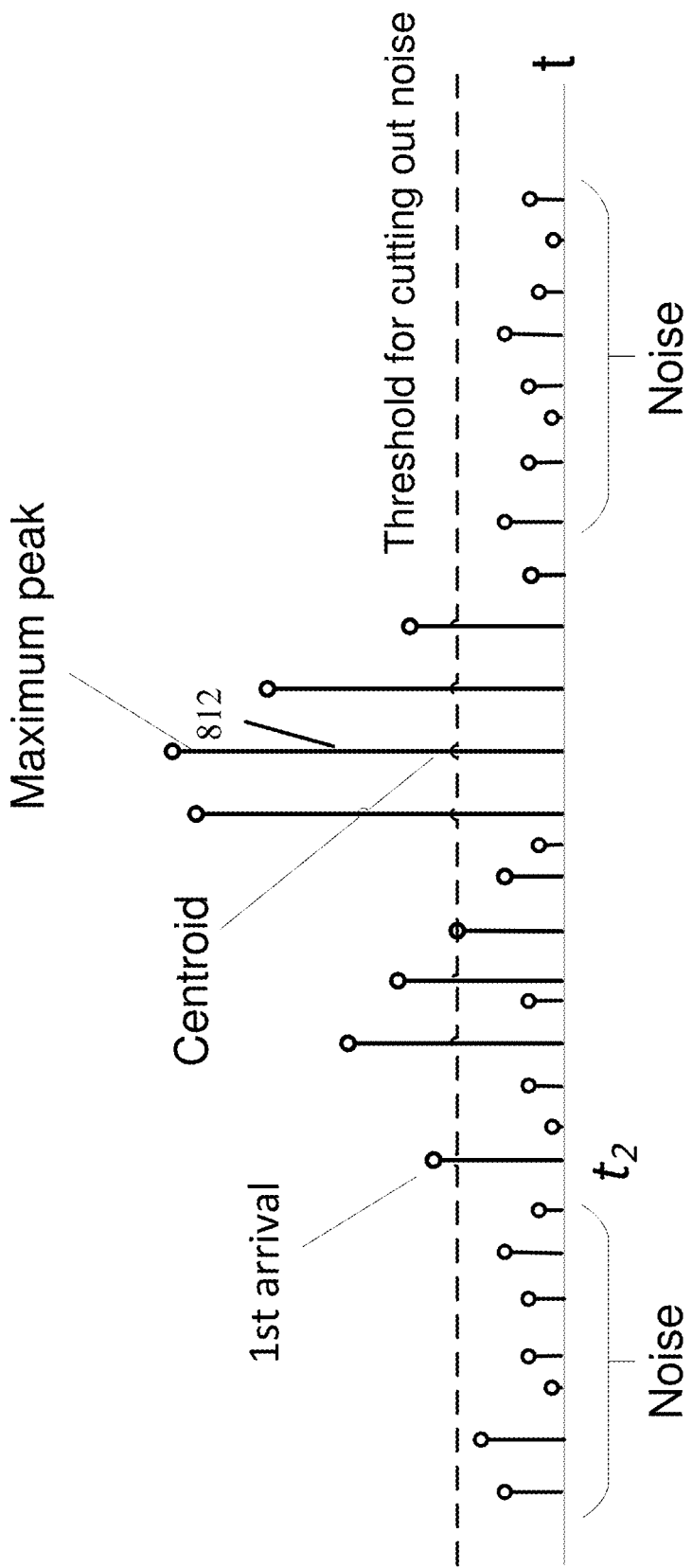
FIG. 8 is a schematic illustration of a channel response estimation in a time-domain, in accordance with some demonstrative embodiments.

Reference is made to FIG. 8, which schematically illustrates a channel response estimation 800 in a time-domain, in accordance with some demonstrative embodiments.

In one example, channel response estimation 800 may be performed in a noise corrupted channel.

In some demonstrative embodiments, as shown in FIG. 8, channel response estimation 800 may include a plurality of channel taps having a plurality of different magnitudes.

In some demonstrative embodiments, a channel tap 812 having the maximum magnitude may be identified as the maximum peak.

In some demonstrative embodiments, a time instance or a time stamp of the maximum peak 812 may be used as the timing value $c_2$ or $c_4$.

In some demonstrative embodiments, since estimated channel taps may be corrupted by noise and/or interference, a maximum peak, e.g., channel tap 812, may have a highest Signal to Interference plus Noise Ratio (SINR), and, therefore, may be a most robust multipath arrival.

In some demonstrative embodiments, one or more variants with lower complexities may be used, for example, since a magnitude or power calculation may involve a square root or a multiplication operation, e.g., as described below.

In one example, magnitudes of real and imaginary parts of each channel tap may be summed up first, e.g., as an approximate magnitude. The approximate magnitudes of the channel taps may then compared, for example, to find a maximal multipath arrival, e.g., channel tap 812, and its corresponding time instance, which may be fed back as the timing value $c_2$ or $c_4$.

In some demonstrative embodiments, channel response estimation 800 may be interpolated, for example, to increase accuracy. For example, zeros may be inserted in the frequency-domain, e.g., before transforming a frequency-domain channel response into channel response estimation 800. A time stamp acquired from an interpolated channel response may usually have a higher accuracy, e.g., than a time stamp acquired without interpolation.

Referring back to FIG. 1, in some demonstrative embodiments, 102 and/or 140 may be configured to determine a timing value of the received sounding transmission, e.g., the first timing value and/or the second timing value, for example, the timing values $c_2$ and/or $c_4$, for example, based on a plurality of multipath arrivals, e.g., as described below.

In some demonstrative embodiments, ranging component 117 may be configured to control, cause and/or trigger device 102 to identify in the estimated time-domain channel response of the first sounding transmission a plurality of multipath arrivals having a magnitude above a predefined threshold, and/or to determine the first timing value based on the plurality of multipath arrivals, e.g., as described below.

In some demonstrative embodiments, ranging component 157 may be configured to control, cause and/or trigger device 140 to identify in the estimated time-domain channel response of the second sounding transmission a plurality of multipath arrivals having a magnitude above a predefined threshold, and/or to determine the second timing value based on the plurality of multipath arrivals, e.g., as described below.

Figure 9:
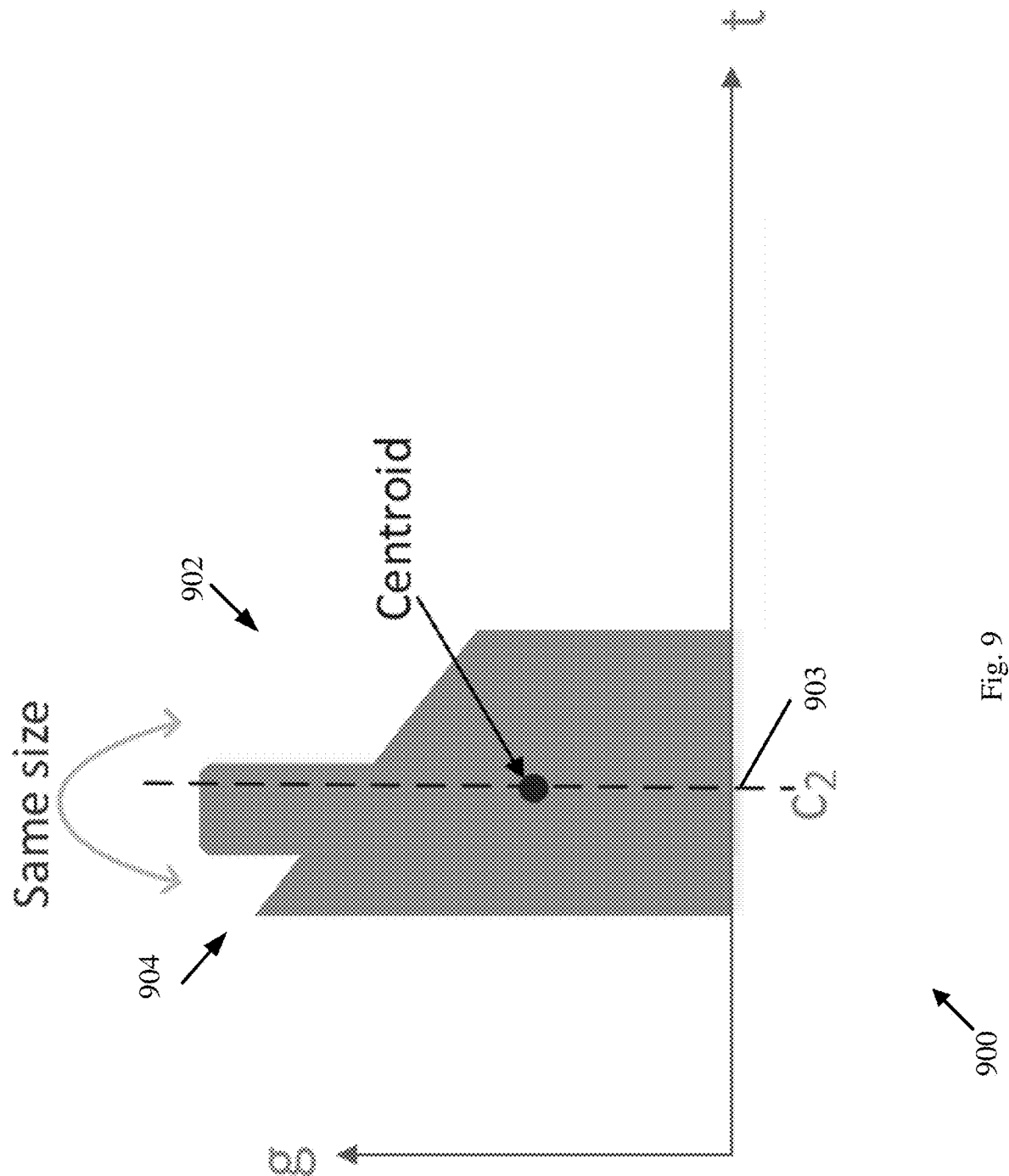
FIG. 9 is a schematic illustration of a channel response estimation in a time-domain, in accordance with some demonstrative embodiments.

Reference is made to FIG. 9, which schematically illustrates a channel response estimation 900 in a time-domain, in accordance with some demonstrative embodiments.

In one example, channel response estimation 900 may be used, for example, instead of channel response estimation 800 (FIG. 8), for example, to avoid a situation in which a maximum peak may or may not be sampled by the two ranging or positioning devices, for example, when channel response estimation 800 (FIG. 8) uses discrete samples, e.g., instead of continuous waveform.

In one example, a channel response may have a single tap, e.g., in an Additive white Gaussian noise (AWGN) channel, and a same sounding signal may be observed by the two devices, e.g., at the same time and/or the same distance. The first device may do a sampling right at the channel tap and thus may see only one channel tap. The second device may not observe the channel tap, e.g., if the channel tap lies between two samples. Therefore, the second device may observe multiple non-zero channel taps that lie on a sinc function.

For example, the single maximum peak observed by the first device may be observed by the second device as being split into multiple peaks. Therefore, the maximum peaks of the two devices may not be at the same time instance, e.g., they may be off by half of the sampling time.

In some demonstrative embodiments, a device, e.g., device 102 and/or 140 (FIG. 1), may use a plurality of samples, e.g., the plurality of multipath arrivals, instead of one, e.g., the maximal multipath arrival, to calculate the timing value of a received sounding signal, e.g., the timing value $c_2$ and/or the timing value $c_4$. For example, the plurality of samples may be utilized to address the technical issue of the sampling time mismatch and/or to suppress the noise.

In some demonstrative embodiments, a channel response in the time-domain may be estimated first, and/or an interpolation over the channel response may or may not be applied.

In some demonstrative embodiments, a threshold may be used to remove channel taps having low SNRs, for example, to suppress a noise effect, e.g., as described below.

In some demonstrative embodiments, the threshold may include a predetermined percentage, e.g., 90% of the maximum peak of estimated channel taps or any other percentage or threshold. For example, low magnitude samples having magnitudes, which are less than 0.9 of the maximum magnitude may be removed.

In some demonstrative embodiments, remaining taps may be divided into two groups, e.g., a first group 902 and a second group 904, such that the first group 902 and the second group 904 have the same area, e.g., after the low magnitude samples are removed.

In some demonstrative embodiments, dividing the remaining taps into groups 902 and 904 may be similar to finding a centroid 903 of channel response estimation 900.

In some demonstrative embodiments, a time instance that divides the channel response estimation 900, e.g., the time instance of centroid 903, may be determined as the timing value $c_2$ or the timing value $c_4$.

In some demonstrative embodiments, since the channel taps may be discrete, an interpolation between the channel taps may be used to calculate the areas 902 and 904, and to divide the whole area evenly. The area may be formed by the channel tap magnitude and time.

In some demonstrative embodiments, the interpolation may be a simple interpolation or any other more complex interpolation, or a complicated interpolation, e.g., a time-domain linear interpolation or a frequency-domain zero insertion.

In some demonstrative embodiments, the interpolation may be done before or after applying the threshold to remove the low magnitude samples, e.g., the small channel taps that are vulnerable to noise.

In one example, setting the threshold to 1.0, e.g., 100%, may converge the estimation of the timing value $c_2$ according to centroid 903 to the estimation according to maximal peak 802 (FIG. 8).

In some demonstrative embodiments, the estimation of the timing value $c_2$ based on the time domain and/or frequency domain channel estimation, e.g., as described above, may be simulated and/or validated, e.g., as described below.

Figure 10:
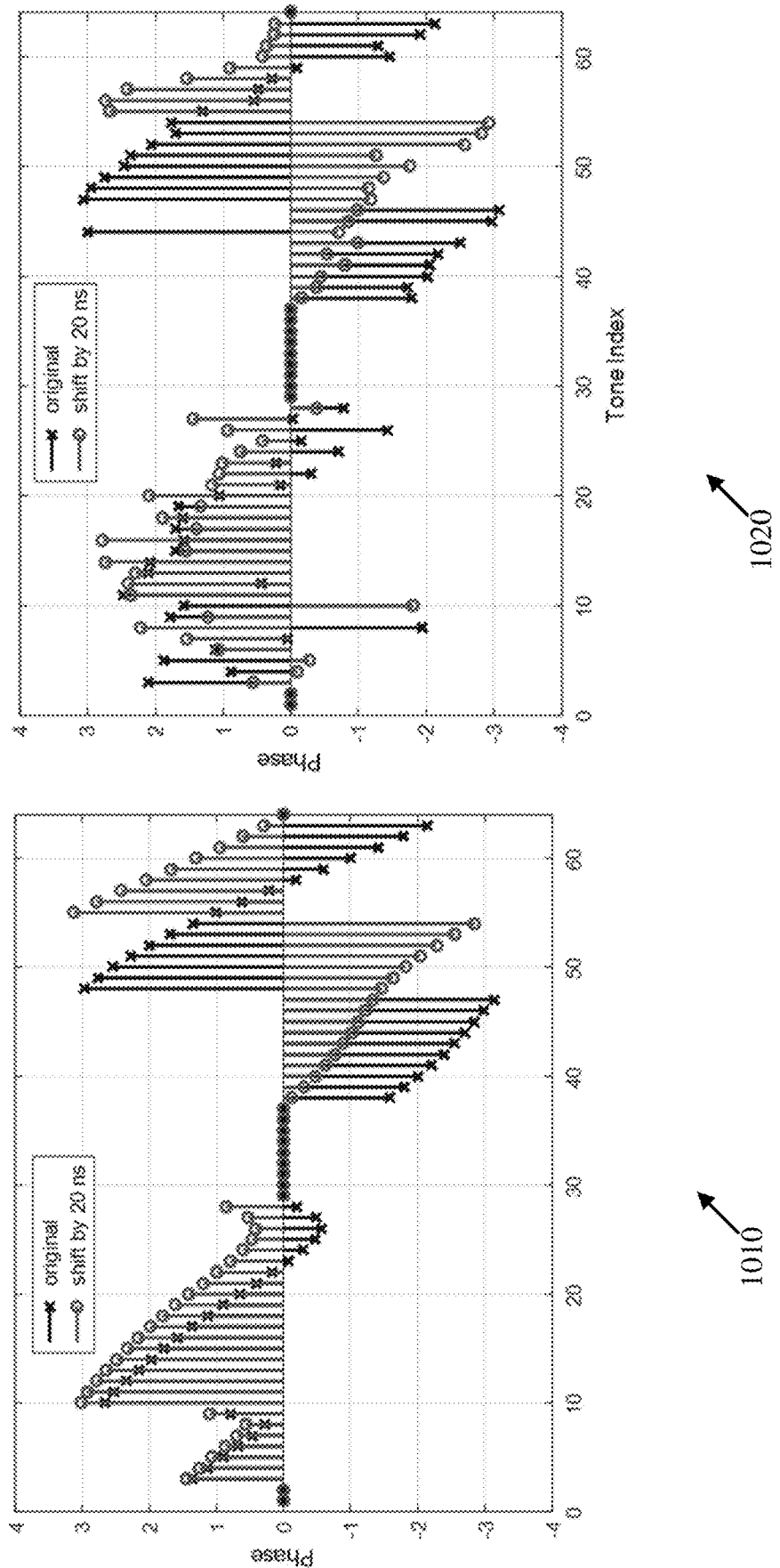
FIG. 10 is a schematic illustration of a first graph depicting a first phase response and a second graph depicting a second phase response, in accordance with some demonstrative embodiments.

Reference is made to FIG. 10, which schematically illustrates a first graph 1010 depicting a first phase response, and a second graph 1020 depicting a second phase response, in accordance with some demonstrative embodiments.

In one example, graph 1010 illustrates phase responses for a clean channel, e.g., without noise, with and without a time shift, and graph 1020 illustrates phase responses for a channel with noise, e.g., having 10 dB SNR, with and without the time shift.

In one example, a 20 MHz bandwidth and a channel model D, e.g., in accordance with an *IEEE* 802.11 *Specification*, with Non Line Of Sight NLOS may be used.

In some demonstrative embodiments, as shown in graphs 1010 and/or 1020, a phase shift, e.g., due to a time shift, may be identified, for example, based on the channel state estimation in the frequency domain, e.g., as described above.

Figure 11:
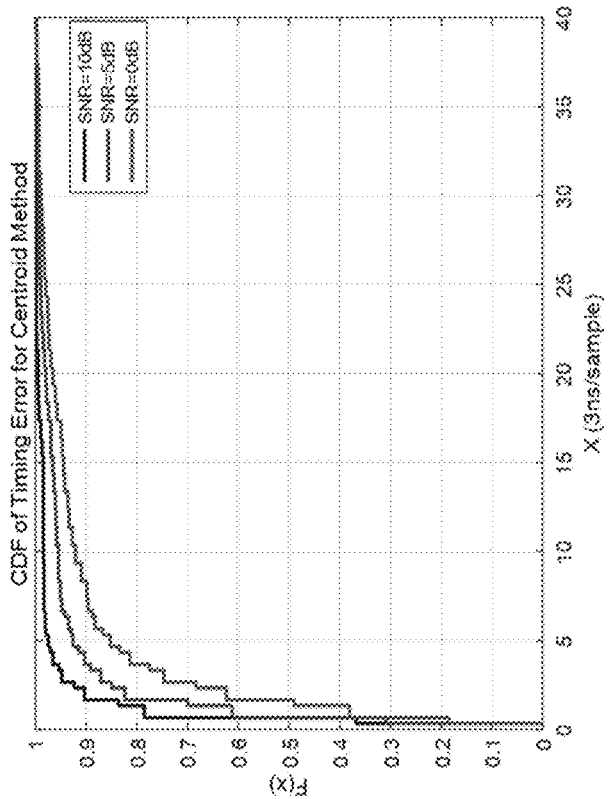
FIG. 11 is a schematic illustration of a first graph depicting distance errors of a first implementation and a second graph depicting distance errors of a second implementation, in accordance with some demonstrative embodiments.
Figure 11:
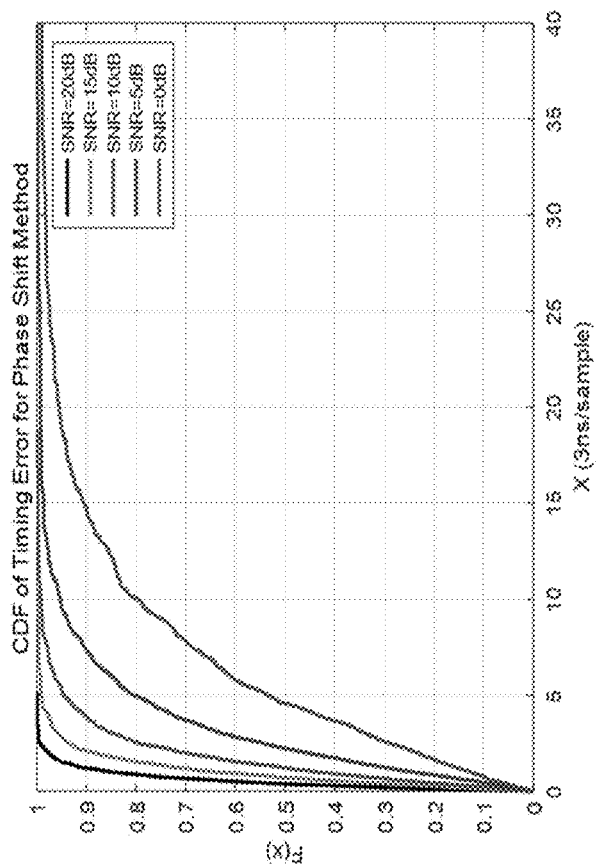

Reference is made to FIG. 11, which schematically illustrates a first graph 1110 depicting distance errors of a first implementation and a second graph 1120 depicting distance errors of a second implementation, in accordance with some demonstrative embodiments.

In one example, a 20 MHz bandwidth and a channel model D, e.g., in accordance with an *IEEE* 802.11 *Specification*, with Non Line Of Sight NLOS may be used.

In some demonstrative embodiments, graph 1110 depicts a Cumulative Distribution Function (CDF) of distance error for, for example, under various SNRs, for example, when the timing value $c_2$ is determined based on the time instance of the maximal channel tap in the time domain channel estimation, e.g., as described above with reference to FIG. 8.

In some demonstrative embodiments, as shown by graph 1110, with a 90% case, a distance error may be less than 3.5 meters (m), e.g., at 10 dB SNR.

In some demonstrative embodiments, graph 1120 depicts a CDF of distance error for the third option, for example, under various SNRs, for example, when the timing value $c_2$ is determined based on the time instance of the centroid of the channel response in the time domain, e.g., as described above with reference to FIG. 9.

In some demonstrative embodiments, as shown by graph 1120, with a 90% case, the distance error may be less than 2 m, e.g., at 10 dB SNR.

In some demonstrative embodiments, performance may be improved, e.g., by four times, and thus a sub-meter accuracy may be achieved, for example, when using an 80 MHz channel.

In some demonstrative embodiments, in many cases, when using real life data to evaluate the ranging performance when using the timing value $c_2$, e.g., the compressed CSI, an additional range error may be limited to 1 m. For some cases, the additional range error may be 2-3 m, and/or the maximum error may be about 5 m.

In some demonstrative embodiments, a magnitude of a complex number may be calculated, for example, for the estimation of the timing value $c_2$ based on the time domain and/or frequency domain channel estimation, e.g., as described above.

In one example, the magnitude may be used to weight the phase difference, for example, for the estimation of the timing value $c_2$ based on the frequency domain channel estimation.

In another example, the magnitude may be calculated to identify a maximum peak among the channel taps, e.g., maximum tap 812 (FIG. 8).

In another example, the magnitude may be calculated to support the removal of the small channel taps, and/or to calculate the area spanned by a channel tap magnitude and time, e.g., as described above with reference to FIG. 9.

In some demonstrative embodiments, calculation of the magnitude of a complex number may require multiplication and/or square root operations, which may have high complexity.

In some demonstrative embodiments, one or more low complexity alternatives may be used. In one example, using a square of the magnitude, e.g., instead of using the magnitude, may allow to avoid performing a square root operation. In another example, the magnitude of a complex number may be approximated, e.g., by the sum of the magnitudes of its real and imaginary parts may be used.

Figure 12:
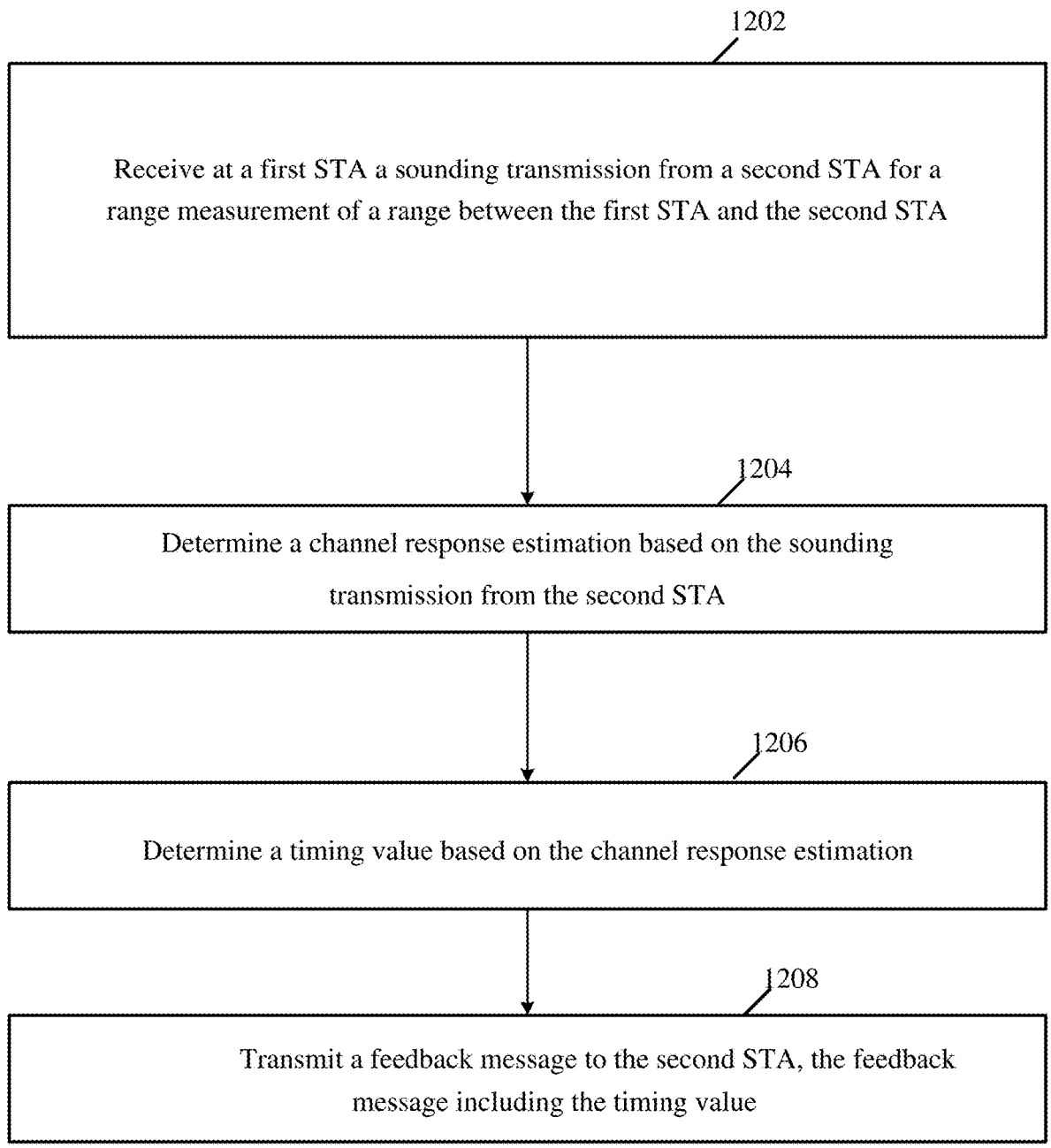
FIG. 12 is a schematic flow-chart illustration of a method of ranging measurement, in accordance with some demonstrative embodiments.

Reference is made to FIG. 12, which schematically illustrates a method of ranging measurement, in accordance with some demonstrative embodiments. For example, one or more of the operations of the method of FIG. 12 may be performed by a wireless communication system, e.g., system 100 (FIG. 1); a wireless communication device, e.g., device 102 and/or device 140 (FIG. 1); a controller, e.g., controller 124 and/or controller 154 (FIG. 1); an application, e.g., application 125 and/or application 145 (FIG. 1); a ranging component, e.g., ranging component 117 and/or ranging component 157 (FIG. 1); a location estimator, e.g., location estimator 115 (FIG. 1); a radio, e.g., radio 114 and/or radio 144 (FIG. 1); a message processor, e.g., message processor 128 (FIG. 1) and/or message processor 158 (FIG. 1); a transmitter, e.g., transmitter 118 and/or transmitter 148 (FIG. 1); and/or a receiver, e.g., receiver 116 and/or receiver 146 (FIG. 1).

As indicated at block 1202, the method may include receiving at a first STA a sounding transmission from a second STA for a range measurement of a range between the first STA and the second STA. For example, ranging component 117 (FIG. 1) may control, cause and/or trigger the STA implemented by device 102 (FIG. 1) to receive from device 140 (FIG. 1) the sounding transmission for the range measurement of the range between devices 102 and 140 (FIG. 1), e.g., as described above.

As indicated at block 1204, the method may include determining a channel response estimation based on the sounding transmission from the second STA. For example, ranging component 117 (FIG. 1) may control, cause and/or trigger the STA implemented by device 102 (FIG. 1) to determine a channel response estimation based on the sounding transmission from device 140 (FIG. 1), e.g., as described above.

As indicated at block 1206, the method may include determining a timing value based on the channel response estimation. For example, ranging component 117 (FIG. 1) may control, cause and/or trigger the STA implemented by device 102 (FIG. 1) to determine the timing value based on the channel response estimation, e.g., as described above.

As indicated at block 1208, the method may include transmitting a feedback message to the second STA, the feedback message including the timing value. For example, ranging component 117 (FIG. 1) may control, cause and/or trigger the STA implemented by device 102 (FIG. 1) to transmit the feedback message to device 140 (FIG. 1), the feedback message including the timing value, e.g., as described above.

Figure 13:
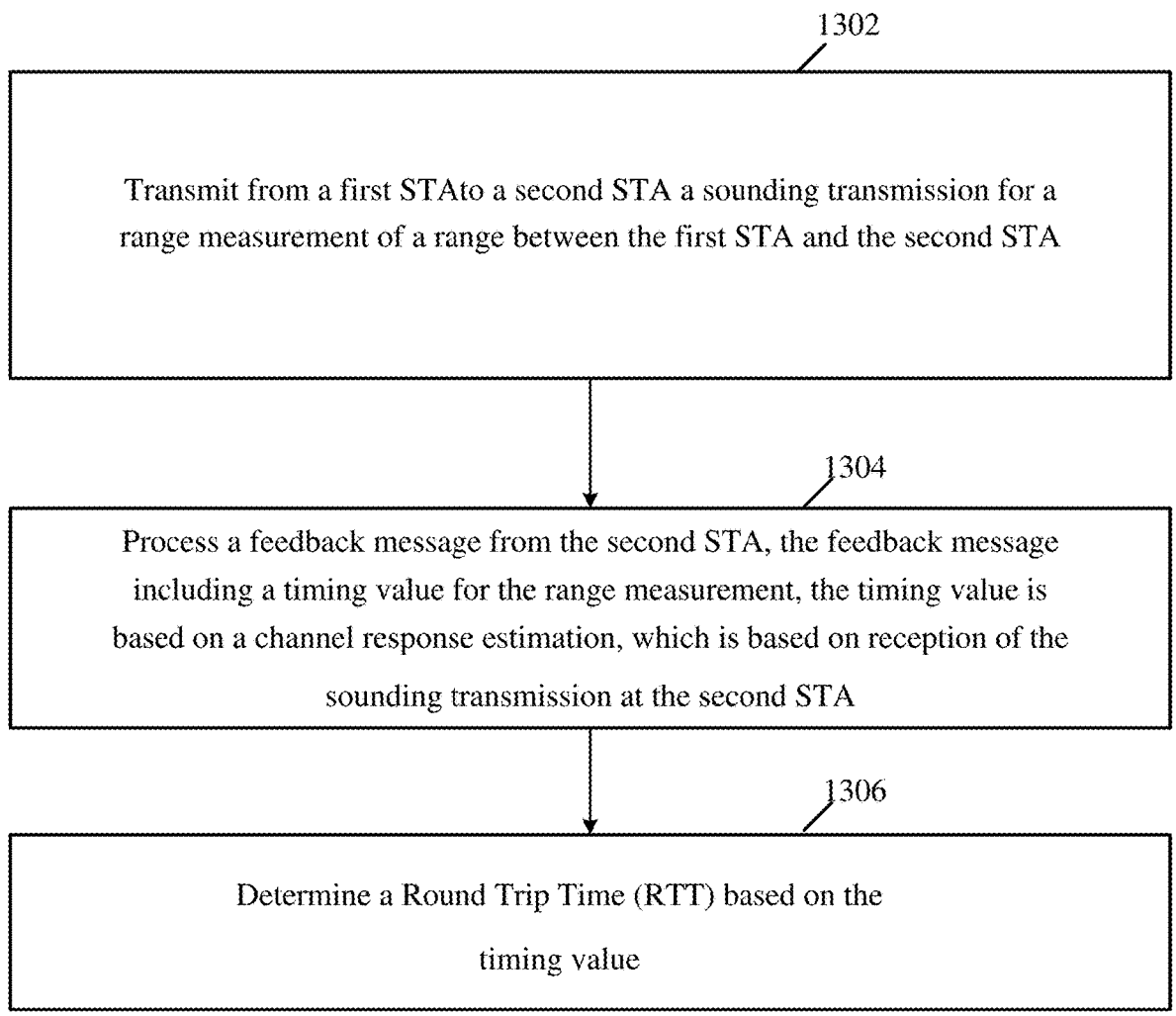
FIG. 13 is a schematic flow-chart illustration of a method of ranging measurement, in accordance with some demonstrative embodiments.

Reference is made to FIG. 13, which schematically illustrates a method of ranging measurement, in accordance with some demonstrative embodiments. For example, one or more of the operations of the method of FIG. 13 may be performed by a wireless communication system, e.g., system 100 (FIG. 1); a wireless communication device, e.g., device 102 and/or device 140 (FIG. 1); a controller, e.g., controller 124 and/or controller 154 (FIG. 1); an application, e.g., application 125 and/or application 145 (FIG. 1); a ranging component, e.g., ranging component 117 and/or ranging component 157 (FIG. 1); a location estimator, e.g., location estimator 115 (FIG. 1); a radio, e.g., radio 114 and/or radio 144 (FIG. 1); a message processor, e.g., message processor 128 (FIG. 1) and/or message processor 158 (FIG. 1); a transmitter, e.g., transmitter 118 and/or transmitter 148 (FIG. 1); and/or a receiver, e.g., receiver 116 and/or receiver 146 (FIG. 1).

As indicated at block 1302, the method may include transmitting from a first STA to a second STA a sounding transmission for a range measurement of a range between the first STA and the second STA. For example, ranging component 157 (FIG. 1) may control, cause and/or trigger the STA implemented by device 140 (FIG. 1) to transmit the sounding transmission for the range measurement of the range between devices 102 and 140 (FIG. 1), e.g., as described above.

As indicated at block 1304, the method may include processing a feedback message from the second STA, the feedback message including a timing value for the range measurement, the timing value is based on a channel response estimation, which is based on reception of the sounding transmission at the second STA. For example, ranging component 157 (FIG. 1) may control, cause and/or trigger the STA implemented by device 140 (FIG. 1) to process the feedback message from device 102 (FIG. 1), the feedback message including the timing value for the range measurement, the timing value may be based on the channel response estimation, which may be based on the reception of the sounding transmission at device 102 (FIG. 1), e.g., as described above.

As indicated at block 1306, the method may include determine an RTT based on the timing value. For example, ranging component 157 (FIG. 1) may control, cause and/or trigger the STA implemented by device 140 (FIG. 1) to determine the RTT based on the timing value, e.g., as described above.

Figure 14:
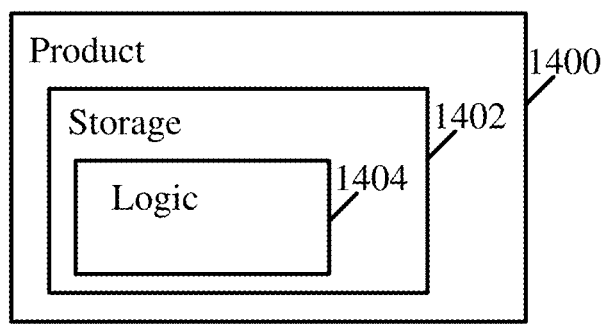
FIG. 14 is a schematic illustration of a product of manufacture, in accordance with some demonstrative embodiments.

Reference is made to FIG. 14, which schematically illustrates a product of manufacture 1400, in accordance with some demonstrative embodiments. Product 1400 may include one or more tangible computer-readable ("machine readable") non-transitory storage media 1402, which may include computer-executable instructions, e.g., implemented by logic 1404, operable to, when executed by at least one processor, e.g., computer processor, enable the at least one processor to implement one or more operations at devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), ranging components 117 and/or 157 (FIG. 1), and/or location estimator 115 (FIG. 1), to cause devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), ranging components 117 and/or 157 (FIG. 1), and/or location estimator 115 155 (FIG. 1) to perform one or more operations, and/or to perform, trigger and/or implement one or more operations, communications and/or functionalities described above with reference to FIGS. 1, 2, 3, 4, 5, 6, 7, 8, 9, 10, 11, 12, and/or 13, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 1400 and/or storage media 1402 may include one or more types of computer-readable storage media capable of storing data, including volatile memory, non-volatile memory, removable or non-removable memory, erasable or non-erasable memory, writeable or re-writeable memory, and the like. For example, storage media 1402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless communication station (STA) to receive from a second STA a sounding transmission for a range measurement of a range between the first STA and the second STA; determine a channel response estimation based on the sounding transmission from the second STA; determine a timing value based on the channel response estimation; and transmit a feedback message to the second STA, the feedback message comprising the timing value.

Example 2 includes the subject matter of Example 1, and optionally, wherein the timing value comprises a phase shift of the sounding transmission.

Example 3 includes the subject matter of Example 1 or 2, and optionally, wherein the apparatus is configured to cause the first STA to determine the timing value based on a frequency-domain channel response estimation of the sounding transmission.

Example 4 includes the subject matter of Example 3, and optionally, wherein the apparatus is configured to cause the first STA to determine the timing value based on a phase slope of the frequency-domain channel response estimation of the sounding transmission.

Example 5 includes the subject matter of Example 1, and optionally, wherein the apparatus is configured to cause the first STA to determine the timing value based on a time-domain channel response estimation of the sounding transmission.

Example 6 includes the subject matter of Example 5, and optionally, wherein the apparatus is configured to cause the first STA to determine the timing value based on a maximal multipath arrival having a maximal magnitude in the estimated time-domain channel response.

Example 7 includes the subject matter of Example 5, and optionally, wherein the apparatus is configured to cause the first STA to identify in the time-domain channel response estimation a plurality of multipath arrivals having a magnitude above a predefined threshold, and to determine the timing value based on the plurality of multipath arrivals.

Example 8 includes the subject matter of any one of Examples 1-7, and optionally, wherein the apparatus is configured to cause the first STA to determine the channel response estimation based on a first sounding transmission from the second STA, and to transmit a second sounding transmission to the second STA.

Example 9 includes the subject matter of Example 8, and optionally, wherein the feedback message comprises a Time of Departure (ToD) value corresponding to a ToD of the second sounding transmission.

Example 10 includes the subject matter of any one of Examples 1-9, and optionally, wherein the feedback message comprises the timing value and a Time of Arrival (ToA) value corresponding to a ToA of the sounding transmission.

Example 11 includes the subject matter of any one of Examples 1-10, and optionally, wherein the timing value is shifted from a Time of Arrival (ToA) of the sounding transmission.

Example 12 includes the subject matter of any one of Examples 1-11, and optionally, wherein the timing value is different from a Time of Arrival (ToA) of the sounding transmission.

Example 13 includes the subject matter of any one of Examples 1-12, and optionally, wherein the timing value is after a Time of Arrival (ToA) of the sounding transmission.

Example 14 includes the subject matter of any one of Examples 1-13, and optionally, wherein the apparatus is configured to cause the first STA to process a report message from the second STA, the report message comprising a Round Trip Time (RTT) based on the timing value.

Example 15 includes the subject matter of any one of Examples 1-14, and optionally, wherein the apparatus is configured to cause the first STA to process a report message from the second STA, the report message comprising an estimated range between the first and second STAs based on the timing value.

Example 16 includes the subject matter of any one of Examples 1-15, and optionally, wherein the sounding transmission comprises a Null Data Packet (NDP).

Example 17 includes the subject matter of any one of Examples 1-16, and optionally, wherein the feedback message comprises a Location Measurement Report (LMR).

Example 18 includes the subject matter of any one of Examples 1-17, and optionally, comprising a radio to receive the sounding transmission and to transmit the feedback message.

Example 19 includes the subject matter of Example 18, and optionally, comprising one or more antennas connected to the radio, a memory, and a processor.

Example 20 includes an apparatus comprising logic and circuitry configured to cause a first wireless communication station (STA) to transmit to a second STA a sounding transmission for a range measurement of a range between the first STA and the second STA; process a feedback message from the second STA, the feedback message comprising a timing value for the range measurement, the timing value is based on a channel response estimation, which is based on reception of the sounding transmission at the second STA; and determine a Round Trip Time (RTT) based on the timing value.

Example 21 includes the subject matter of Example 20, and optionally, wherein the apparatus is configured to cause the first STA to transmit the sounding transmission to the second STA as a first sounding transmission, to process the feedback message comprising a first timing value, which is based on a first channel response estimation of the first sounding transmission, to determine a second channel response estimation based on a second sounding transmission from the second STA, to determine a second timing value based on the second channel response estimation, and to determine the RTT based on the first and second timing values.

Example 22 includes the subject matter of Example 21, and optionally, wherein the apparatus is configured to cause the first STA to determine a Time of Arrival (ToA) of the second sounding transmission, and to determine the RTT based on a Time of Departure (ToD) of the first sounding transmission, the ToA of the second sounding transmission, the first and second timing values, and a ToD value in the feedback message corresponding to a ToD of the second sounding transmission.

Example 23 includes the subject matter of Example 21 or 22, and optionally, wherein the second timing value comprises a phase shift of the second sounding transmission.

Example 24 includes the subject matter of any one of Examples 21-23, and optionally, wherein the apparatus is configured to cause the first STA to determine the second timing value based on a frequency-domain channel response estimation of the second sounding transmission.

Example 25 includes the subject matter of Example 24, and optionally, wherein the apparatus is configured to cause the first STA to determine the second timing value based on a phase slope of the frequency-domain channel response estimation of the second sounding transmission.

Example 26 includes the subject matter of Example 21 or 22, and optionally, wherein the apparatus is configured to cause the first STA to determine the second timing value based on a time-domain channel response estimation of the second sounding transmission.

Example 27 includes the subject matter of Example 26, and optionally, wherein the apparatus is configured to cause the first STA to determine the second timing value based on a maximal multipath arrival having a maximal magnitude in the estimated time-domain channel response.

Example 28 includes the subject matter of Example 26, and optionally, wherein the apparatus is configured to cause the first STA to identify in the estimated time-domain channel response a plurality of multipath arrivals having a magnitude above a predefined threshold, and to determine the second timing value based on the plurality of multipath arrivals.

Example 29 includes the subject matter of any one of Examples 21-28, and optionally, wherein the second timing value is shifted from a Time of Arrival (ToA) of the second sounding transmission.

Example 30 includes the subject matter of any one of Examples 21-29, and optionally, wherein the second timing value is different from a Time of Arrival (ToA) of the second sounding transmission.

Example 31 includes the subject matter of any one of Examples 21-30, and optionally, wherein the second timing value is after Time of Arrival (ToA) of the second sounding transmission.

Example 32 includes the subject matter of any one of Examples 20-31, and optionally, wherein the apparatus is configured to cause the first STA to determine an estimated range between the first and second STAs based on the RTT.

Example 33 includes the subject matter of Example 32, and optionally, wherein the apparatus is configured to cause the first STA to transmit a report message to the second STA, the report message comprising the estimated range between the first and second STAs.

Example 34 includes the subject matter of any one of Examples 20-33, and optionally, wherein the apparatus is configured to cause the first STA to transmit to the second STA a report message comprising range measurement information based on the RTT.

Example 35 includes the subject matter of any one of Examples 20-34, and optionally, wherein the sounding transmission comprises a Null Data Packet (NDP).

Example 36 includes the subject matter of any one of Examples 20-35, and optionally, wherein the feedback message comprises a Location Measurement Report (LMR).

Example 37 includes the subject matter of any one of Examples 20-36, and optionally, comprising a radio to transmit the sounding transmission, and to receive the feedback message.

Example 38 includes the subject matter of Example 37, and optionally, comprising one or more antennas connected to the radio, a memory, and a processor.

Example 39 comprises an apparatus comprising means for executing any of the described operations of Examples 1-38.

Example 40 comprises a machine-readable medium that stores instructions for execution by a processor to perform any of the described operations of Examples 1-38.

Example 41 comprises an apparatus comprising: a memory interface; and processing circuitry configured to: perform any of the described operations of Examples 1-38.

Example 42 comprises a method to perform any of the described operations of Examples 1-38.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause a first wireless communication station (STA) to:
   transmit a first Null Data Packet (NDP) to a second STA;
   determine a Time of Arrival (ToA) of a second NDP from the second STA;
   determine a phase shift value corresponding to the second NDP based on a channel estimation of the second NDP;
   process a Location Measurement Report (LMR) from the second STA, the LMR comprising a phase shift value corresponding to the first NDP and a Time of Departure (ToD) value corresponding to a ToD of the second NDP; and
   determine a Round Trip Time (RTT) based on a ToD of the first NDP, the ToA of the second NDP, the ToD value in the LMR, the phase shift value corresponding to the second NDP, and the phase shift value corresponding to the first NDP.

2. The apparatus of claim 1 configured to cause the first STA to determine the phase shift value corresponding to the second NDP based on a frequency-domain channel estimation of the second NDP.

3. The apparatus of claim 2 configured to cause the first STA to determine the phase shift value corresponding to the second NDP based on a phase slope of the frequency-domain channel estimation of the second NDP.

4. The apparatus of claim 2 configured to cause the first STA to determine the phase shift value corresponding to the second NDP based on a linear phase shift of the frequency-domain channel estimation of the second NDP.

5. The apparatus of claim 2 configured to cause the first STA to determine the phase shift value corresponding to the second NDP based on a phase difference between a pair of subcarriers and based on a subcarrier spacing.

6. The apparatus of claim 1 configured to cause the first STA to determine the RTT as follows:

$$RTT = t_4 - t_1 - \{t_3 - [c_2 - (c_4 - t_4)]\}$$

wherein $t_1$ denotes the ToD of the first NDP, $t_3$ denotes the ToD value in the LMR, $t_4$ denotes the TOA of the second NDP, $c_2$ denotes the phase shift value corresponding to the first NDP, and $c_4$ denotes the phase shift value corresponding to the second NDP.

7. The apparatus of claim 1, wherein the phase shift value corresponding to the second NDP comprises a timing value, which is different from the ToA of the second NDP.

8. The apparatus of claim 1 configured to cause the first STA to determine a location of the first STA based on the RTT.

9. The apparatus of claim 1 comprising a radio to transmit the first NDP, and to receive the second NDP and the LMR.

10. The apparatus of claim 9 comprising one or more antennas connected to the radio, another memory to store data processed by the first STA, and another processor to execute instructions of an operating system.

11. A product comprising one or more tangible computer-readable non-transitory storage media comprising computer-executable instructions operable to, when executed by at least one processor, enable the at least one processor to cause a first wireless communication station (STA) to:
   transmit a first Null Data Packet (NDP) to a second STA;
   determine a Time of Arrival (ToA) of a second NDP from the second STA;
   determine a phase shift value corresponding to the second NDP based on a channel estimation of the second NDP;
   process a Location Measurement Report (LMR) from the second STA, the LMR comprising a phase shift value corresponding to the first NDP and a Time of Departure (ToD) value corresponding to a ToD of the second NDP; and determine a Round Trip Time (RTT) based on a ToD of the first NDP, the ToA of the second NDP, the ToD value in the LMR, the phase shift value corresponding to the second NDP, and the phase shift value corresponding to the first NDP.

12. The product of claim 11, wherein the instructions, when executed, cause the first STA to determine the phase shift value corresponding to the second NDP based on a frequency-domain channel estimation of the second NDP.

13. The product of claim 12, wherein the instructions, when executed, cause the first STA to determine the phase shift value corresponding to the second NDP based on a phase slope of the frequency-domain channel estimation of the second NDP.

14. The product of claim 11, wherein the instructions, when executed, cause the first STA to determine the RTT as follows:

$$RTT = t_4 - t_1 - \{t_3 - [c_2 - (c_4 - t_4)]\}$$

wherein $t_1$ denotes the ToD of the first NDP, $t_3$ denotes the ToD value in the LMR, $t_4$ denotes the TOA of the second NDP, $c_2$ denotes the phase shift value corresponding to the first NDP, and $c_4$ denotes the phase shift value corresponding to the second NDP.

15. An apparatus comprising:
memory circuitry; and
a processor comprising logic and circuitry configured to cause a first wireless communication station (STA) to:
process a first Null Data Packet (NDP) from a second STA for a ranging measurement between the first STA and the second STA;
determine a phase shift value based on a channel estimation of the first NDP;
transmit a second NDP to the second STA; and
transmit a Location Measurement Report (LMR) to the second STA, the LMR comprising the phase shift value and a Time of Departure (ToD) value corresponding to a ToD of the second NDP.

16. The apparatus of claim 15 configured to cause the first STA to determine the phase shift value based on a frequency-domain channel estimation of the first NDP.

17. The apparatus of claim 16 configured to cause the first STA to determine the phase shift value based on a phase slope of the frequency-domain channel estimation of the first NDP.

18. The apparatus of claim 16 configured to cause the first STA to determine the phase shift value based on a linear phase shift of the frequency-domain channel estimation of the first NDP.

19. The apparatus of claim 16 configured to cause the first STA to determine the phase shift value based on a phase difference between a pair of subcarriers and based on a subcarrier spacing.

20. The apparatus of claim 15 configured to cause the first STA to select to include the phase shift value in the LMR instead of a Time of Arrival (ToA) value corresponding to a ToA of the first NDP.

21. The apparatus of claim 15, wherein the phase shift value comprises a timing value, which is different from a Time of Arrival (ToA) of the first NDP.

22. The apparatus of claim 15 comprising a radio to receive the first NDP, and to transmit the second NDP and the LMR.

23. The apparatus of claim 22 comprising one or more antennas connected to the radio, another memory to store data processed by the first STA, and another processor to execute instructions of an operating system.

24. An apparatus comprising:
means for processing at a first wireless communication station (STA) a first Null Data Packet (NDP) from a second STA for a ranging measurement between the first STA and the second STA;
means for determining a phase shift value based on a channel estimation of the first NDP;
means for causing the first STA to transmit a second NDP to the second STA; and
means for causing the first STA to transmit a Location Measurement Report (LMR) to the second STA, the LMR comprising the phase shift value and a Time of Departure (ToD) value corresponding to a ToD of the second NDP.

25. The apparatus of claim 24 comprising means for selecting to include the phase shift value in the LMR instead of a Time of Arrival (ToA) value corresponding to a ToA of the first NDP.

* * * * *